United States Patent
Malomsoky et al.

(10) Patent No.: US 7,283,535 B2
(45) Date of Patent: Oct. 16, 2007

(54) CONCENTRATOR FOR USER AAL2 TRAFFIC CARRIED ON UBR VIRTUAL CHANNELS

(75) Inventors: Szabolcs Malomsoky, Szentendre (HU); Szilveszter Nádas, Meztúr (HU); Sándor Racz, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1052 days.

(21) Appl. No.: 10/281,264

(22) Filed: Oct. 28, 2002

(65) Prior Publication Data

US 2004/0081168 A1   Apr. 29, 2004

(51) Int. Cl.
*H04L 12/28* (2006.01)
*H04L 12/56* (2006.01)

(52) U.S. Cl. .............................. 370/395.64; 370/395.1; 370/395.6

(58) Field of Classification Search ............. 370/395.1, 370/395.2, 395.6, 395.64
See application file for complete search history.

(56) References Cited

U.S. PATENT DOCUMENTS

| | | | |
|---|---|---|---|
| 6,034,958 A | 3/2000 | Wicklund | |
| 6,128,295 A | 10/2000 | Larsson et al. | |
| 6,449,275 B1 | 9/2002 | Andersson et al. | |
| 6,483,831 B1 | 11/2002 | Petersen | |
| 6,483,838 B1 | 11/2002 | Östman et al. | |
| 6,504,845 B1 | 1/2003 | Petersen et al. | |
| 6,597,698 B1 | 7/2003 | Lundbäck et al. | |
| 6,738,381 B1 | 5/2004 | Agnevik et al. | |
| 6,747,954 B1 | 6/2004 | Petersen et al. | |
| 6,804,246 B1 | 10/2004 | Petersen et al. | |

2002/0181470 A1* 12/2002 Agnevik et al. ....... 370/395.21

FOREIGN PATENT DOCUMENTS

| | | |
|---|---|---|
| CA | 2 267 429 A | 9/2000 |
| WO | 98/24264 A | 6/1998 |
| WO | 98/27692 A | 6/1998 |

OTHER PUBLICATIONS

Saito, Hiroshi. Bandwidth Management for AAL2 Traffic. IEEE. Jul. 2000. pp. 1364-1377.*
Eneroth et al. "Applying ATM/AAL2 as a Switching Technology in Third-Generation Mobile Access Networks". IEEE. Jun. 1999. pp. 112-122.*
Saikto, "Effectiveness of UBR VC Approach in AAL2 Networks and Its Application to IMT-2000", IEICE Trans. Commun., vol. E83-B, No. 11, Nov. 2000, pp. 2486-2493.

* cited by examiner

*Primary Examiner*—Chirag G. Shah
(74) *Attorney, Agent, or Firm*—Nixon & Vanderhye, P.C.

(57) ABSTRACT

A traffic concentrator (40) aggregates traffic in a radio access network. The traffic concentrator comprises an Asynchronous Transfer Mode (ATM) switch (42) and a control node (44) associated with the ATM switch. The Asynchronous Transfer Mode (ATM) switch which performs a switching operation for switching unspecified bit rate (UBR) virtual channels (VCs) carrying user traffic between plural virtual paths (VPs). The user traffic is transported as ATM Adaptation Layer 2 (AAL2) connections over the unspecified bit rate (UBR) virtual channels (VCs). The control node is arranged to process AAL2 signaling messages which concern the AAL2 connections included in the VCs for which the ATM switch performs the switching operation. The AAL2 signaling messages are carried in virtual channels which do not carry the user traffic and which are either originated or terminated at the control node. In one example implementation, the traffic concentrator aggregates traffic of plural base stations of the radio access network.

32 Claims, 15 Drawing Sheets

CONCENTRATOR FOR USER AAL2 TRAFFIC CARRIED ON UBR VIRTUAL CHANNELS

BACKGROUND

1. Field of the Invention

This invention pertains to telecommunications, and particularly concentration of user traffic in a radio access network.

2. Related Art and other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

The transmission infrastructure of cellular mobile access networks is expensive, mainly because it carries the traffic of a large number of bases stations. In order to reduce transmission costs, traffic concentrator nodes are placed in the access networks. These nodes are able to aggregate the traffic of base stations over large links, such that a significant statistical multiplexing gain can be achieved on those large links.

If a concentrator node is introduced in the network, the cost of the concentrator node should be smaller than the cost saving that results from the traffic concentration. Also, introduction of the concentrator node should not deteriorate the end-to-end performance.

Asynchronous Transfer Mode (ATM) is becoming increasingly used in communication networks. ATM is a packet-oriented transfer mode which uses asynchronous time division multiplexing techniques. Packets are called cells and have a fixed size.

As illustrated in FIG. 1, an ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, modem communication networks can cross connect traffic flows to form logical end-to-end connections between all origin-destination pairs and thus create fully meshed logical networks. Such logical connections are known as virtual path (VP) connections (VPC). The virtual channel (VC) is one specific connection on the respective virtual path.

Between termination points of an ATM network a plurality of nodes are typically situated, such as switching nodes having ports which are connected together by physical transmission paths or links. The switching nodes each typically have several functional parts, a primary of which is a switch core. The switch core essentially functions like a cross-connect between ports of the switch. Paths internal to the switch core are selectively controlled so that particular ports of the switch are connected together to allow a cell ultimately to travel from an ingress side of the switch to an egress side of the switch. The switch changes the identifiers of the ATM cells (VPI and VCI) and routes the cells towards the appropriate physical interface.

Various aspects of ATM-based telecommunications are described in the following: U.S. patent application Ser. No. 09/188,101 [PCT/SE98/02325] and Ser. No. 09/188,265 [PCT/SE98/02326] entitled "Asynchronous Transfer Mode Switch"; U.S. patent application Ser. No. 09/188,102 [PCT/SE98/02249] entitled "Asynchronous Transfer Mode System"; U.S. patent application Ser. No. 09/188,102, entitled "Asynchronous Transfer Mode System Handling Differing AAL Protocols"; U.S. patent application Ser. No. 09/188,097, entitled "Centralized Queuing for ATM Node"; U.S. patent application Ser. No. 09/188,340, entitled "Cell Handling Unit and Method for ATM Node"; U.S. patent application Ser. No. 09/188,347, entitled "ATM Time-Stamped Queuing"; U.S. patent application Ser. No. 09/188,344, entitled "Coordinated Cell Discharge From ATM Queue"; U.S. patent application Ser. No. 09/188,096, entitled "Combined Header Parameter Table for ATM Node"; U.S. patent application Ser. No. 09/134,358, entitled "Cell Selection for ATM Switch Having Redundant Switch Planes"; U.S. patent application Ser. No. 09/213,897, entitled "Internal Routing Through Multi-Staged ATM Node"; U.S. patent application Ser. No. 08/893,507, entitled "Augmentation of ATM Cell With Buffering Data"; U.S. patent application Ser. No. 08/893,677, entitled "Buffering of Point-to-Point and/or Point-to-Multipoint ATM Cells"; and U.S. patent application Ser. No. 08/893,479, entitled "VP/VC Look-Up Function", all of which are incorporated herein by reference in their entirety.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa. There are several differing AAL types or categories, including AAL0, AAL1, AAL2, AAL3/4, and AAL5.

AAL2 is a standard defined by ITU recommendation I.363.2. An AAL2 packet is shown in FIG. 2 as comprising a three octet packet header, as well as a packet payload. The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets.

FIG. 3 shows how plural AAL2 packets can be inserted into a standard ATM cell. In particular, FIG. 3 shows a first ATM cell $20_1$ and a second ATM cell $20_2$. Each ATM cell $20$ has a header $22$ (e.g., cell $20_1$ has header $22_1$ and cell $20_2$ has header $22_2$). The payload of the ATM cells $20$ begin with a start field $24$ (e.g., cell $20_1$ has start field $24_1$ and cell $20_2$ has start field $24_2$). After each start field $24$, the ATM cell payload contains AAL2 packets. For example, the payload of ATM cell $20_1$ contains AAL2 packets $26_1$ and $26_2$ in their entirety, as well as a portion of AAL2 packet $26_3$. The payload of cell $20_2$ contains the rest of AAL2 packet $26_3$, and AAL2 packets $26_4$ and $26_5$ in their entirety. In addition, the payload of cell $20_2$ has padding $28$. The start field facilitates one AAL2 packet bridging two ATM cells.

Thus, in ATM networks, cells are transported along pre-defined paths using the VPI/VCI (virtual path and virtual channel identifier) fields in the ATM header. For AAL2, each specific AAL2 connection within an ATM VC is identified by the CID (connection identifier) field in the AAL2 header. A CU timer ($T_{CU}$) determines how long the multiplexer should wait for arriving AAL2 packets before transmitting a partly filled ATM cell. Therefore, multiplexing efficiency also depends on the value of $T_{CU}$. In the case of highly utilized links, this dependency can be neglected.

In ATM/AAL2-based UMTS access networks (UTRANs), traffic concentration can be implemented by various combinations of different ATM and AAL2 features. The major issues involved are (1) the type of ATM Virtual Channels (VCs) to be used, i.e., CBR (Constant Bit Rate), VBR (Variable Bit Rate), or UBR (Unspecified Bit Rate), and (2) whether AAL2 switching or only ATM VC switching is to be used. Usually CBR Virtual Paths (VPs) are used. Four switching alternatives—alternative A through alternative D are described below with reference to FIGS. 4A-4D, respectively.

Alternative A (illustrated in FIG. 4A) uses ATM VC switches and CBR/rt-VBR VCs for traffic aggregation. Alternative A also utilizes end-to-end VCs, with VC capacities being defined such that the AAL2 Connection ID-limit (a maximum of 248 AAL2 connections can be multiplexed in a VC) is taken into account. If the VCs are too large, the CID limit may preclude full use of the VC capacity (having many narrow-band connections). On the other hand, if the VCs are too small, packet-level statistical gains are decreased and also granularity problems arise.

Alternative B (illustrated in FIG. 4B) uses AAL2 switches and CBR/rt-VBR VCs for traffic aggregation. Alternative B is similar to Alternative A, but there are no end-to-end VCs. As a result, in a concentration node AAL2 connections are switched from one VC to another.

Alternative C (illustrated in FIG. 4C) uses AAL2 switches and UBR VCs (but CBR VPs) for traffic aggregation. Alternative C is similar to Alternative B, but (in Alternative C) UBR VCs are used. Since there is no bandwidth assigned to UBR VCs, in FIG. 4C, 1 the 'pipe' of the VCs is not depicted. In the concentration nodes AAL2 connection admission control (CAC) over the VP resources can easily be done, because there are always AAL2 switches there. Alternative C is expected to have the best performance from statistical multiplexing point of view.

The use of VBR is problematic for several reasons. A first reason is that resource allocation for VBR is very complex in general. A second reason is that in UTRAN the AAL2 traffic descriptors do not contain enough information for VBR resource allocation. Therefore the use of CBR or UBR (in CBR VPs) is more straightforward.

Alternative A is simple, however, significant statistical multiplexing gains can not be achieved. With Alternative B and Alternative C the significant gains can be achieved, but the concentrator node (AAL2 switch) may be expensive, because AAL2 de-multiplexing and multiplexing needs to be done in the AAL2 switches as illustrated in FIG. 5. Furthermore, AAL2 switching introduces delays, which can be avoided if only VC switching is used. From the node implementation point of view, large AAL2 switches may be difficult to realize because, e.g., a large amount of processing capacity is needed.

Alternative D (illustrated in FIG. 4D) uses ATM VC switches and UBR VCs (but CBR VPs) for traffic aggregation. The CID limit is not a problem for alternative D, because there is no bandwidth associated with the UBR VCs. Using alternative D, AAL2 connection admission control (CAC) needs to be done over the CBR VP resource. A benefit of using alternative D is that AAL2 switching is avoided, but the same statistical multiplexing gain (as with AAL2 switching) can be achieved. A disadvantage with alternative D is that since only VC switching is done, the number of VCs used for transmitting AAL2 traffic is not reduced.

Alternative D is described, to some extent, in the following: (1) H. Saito, "Effectiveness of UBR VC Approach in AAL2 Networks and Its Application to IMT-2000", IEICE Transactions on Communications, Vol. E83-B, No. 11, 2000; and (2) H. Saito, "Performance Evaluation of AAL2 Switch Networks", IEICE Transactions on Communications, Vol. E82-B, No. 9, 1999.

A basic problem with Alternative D is that the AAL2 standard assumes that AAL2 endpoints can reside at places where the ATM VCs are terminated. Alternative D does not satisfy this assumption. Rather, Alternative D can only be implemented in an AAL2 endpoint which (1) has information about all the AAL2 connection requests and (2) knows the topology and the configuration of the network. In other words, the alternative D can only be implemented at a point which can do admission control for essentially the whole network. Such a location can be a radio network controller (RNC) node if the network has a tree topology. Therefore, it is not good practice, and extremely difficult to arrange, a concentrator point (comprising an ATM switch) configured to use alternative D while bandwidth management functions of the virtual channels are located elsewhere (at an RNC). If the network does not have a tree topology, alternative D is even more problematic. Thus, it is perplexing how to process AAL2 signaling messages in alternative D while performing AAL2 CAC in such a manner that the ATM infrastructure is not touched.

What is needed, therefore, and an object of the invention, is an efficient traffic concentrator for a telecommunications network such as a radio access network, for example.

BRIEF SUMMARY

A traffic concentrator aggregates traffic in a radio access network. The traffic concentrator comprises an Asynchronous Transfer Mode (ATM) switch and a control node associated with the ATM switch. The Asynchronous Transfer Mode (ATM) switch performs a switching operation for switching unspecified bit rate (UBR) virtual channels (VCs) carrying user traffic between plural virtual paths (VPs). The user traffic is transported as ATM Adaptation Layer 2 (AAL2) connections over the unspecified bit rate (UBR) virtual channels (VCs). The control node is arranged to process AAL2 signaling messages which concern the AAL2 connections included in the VCs for which the ATM switch performs the switching operation.

The control node preferably comprises an AAL2 signaling processor; one or more VC handler units; one or more connection admission control (CAC) units; and, one or more ATM consistency configuration check units. The AAL2 signaling processor initiates or receives the AAL2 signaling messages. Each of the plural virtual channels involved in the switching operation is handled or managed by one of the VC handler units. Each of the plural virtual paths involved in the switching operation is served by one of the connection admission control (CAC) units. The connection admission control (CAC) unit makes decisions regarding allocation of resources in a transport network. Each of the plural virtual paths involved in the switching operation is served by one of the ATM consistency configuration check units. The ATM consistency configuration check unit ensures that switching occurs between appropriate virtual channels (VCs).

The AAL2 signaling messages are carried in virtual channels which do not carry the user traffic and which are either originated or terminated at the control node. For example, in an illustrative implementation the AAL2 signaling messages are carried in at least one constant bit rate (CBR) virtual channel.

The ATM switch and control node of the traffic concentrator may be situated in a variety of configurations. For example, the ATM switch and control node may be co-located at a same node of the radio access network. In fact, the control node may reside on a board connected to appropriate switch ports of the ATM switch. Alternatively, the ATM switch and control node may reside at differing physical nodes of the radio access network.

In an alternate configuration, one control node may actually comprise plural traffic concentrators by serving plural concentrator-included ATM switches. As an enhancement in some configurations, the control nodes may perform connection admission control (CAC) not only with respect to virtual paths (VPs) which originate from the ATM switch with which the control node is paired to form a traffic concentrator, but with respect to virtual paths (VPs) which originate from other ATM switches as well.

In one example implementation, the traffic concentrator aggregates traffic of plural base stations of the radio access network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 6:
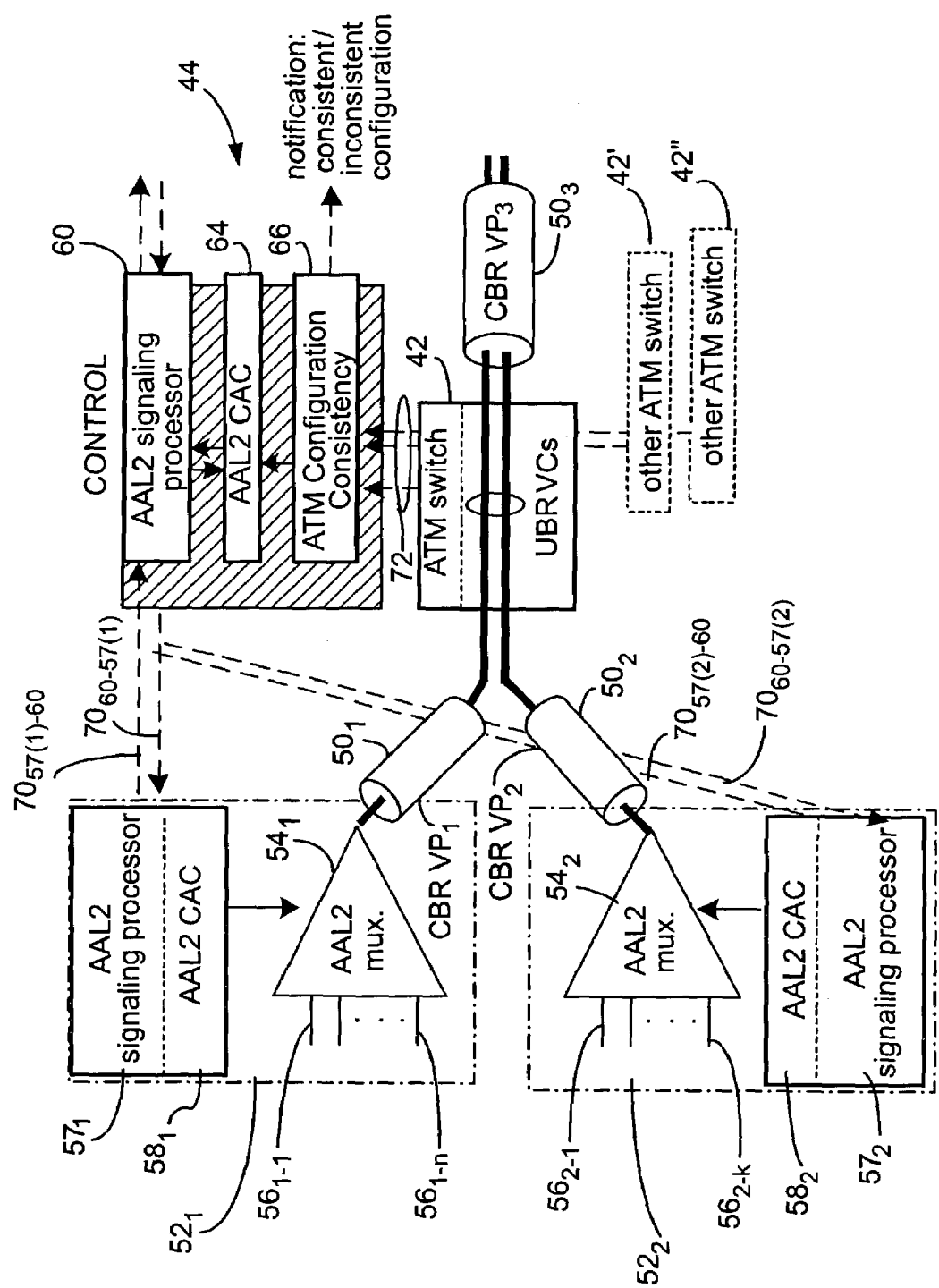
FIG. 6 is a diagrammatic view of a concentrator which includes an ATM switch and a control node.

FIG. 6 shows portions of a radio access network, and particularly a traffic concentrator 40 which aggregates traffic in a radio access network. The traffic concentrator 40 comprises an Asynchronous Transfer Mode (ATM) switch 42 and a control node 44 associated with the ATM switch 42.

The ATM switch 42 is typically connected by an ATM network to other ATM switches, such as ATM switches 42' and 42" illustrated in FIG. 6.

The Asynchronous Transfer Mode (ATM) switch 42 performs a switching operation for switching unspecified bit rate (UBR) virtual channels (VCs) carrying user traffic between plural virtual paths (VPs). FIG. 6 shows, in representative fashion, ATM switch 42 performing its switching operation between three constant bit rate (CBR) virtual paths (VPs) $50_1$, $50_2$, and $50_3$, also illustrated as $VP_1$, $VP_2$, and $VP_3$. It just so happens that the traffic concentrator 40 is concentrating the traffic from the virtual channels (VCs) carried by $VP_1$ and $VP_2$ into $VP_3$ by switching the connections carried by $VP_1$ and $VP_2$ into $VP_3$. It may be, by way of example utilization, that the connections carried by $VP_1$ are uplink transmissions from a first base station, while the connections carried by $VP_1$ are uplink transmissions from a second base station, and that $VP_3$ is ultimately connected to a radio network controller (RNC) node which controls both the first base station and the second base station.

It should be understood that, although traffic concentrator 40 with its ATM switch 42 are illustrated for sake of simplicity as switching between only three virtual paths (VPs), a greater number of virtual paths (VPs) may be involved in other embodiments. For example, traffic from more than one base station may be concentrated toward an radio network controller. Moreover, the use of traffic concentrator 40 on an uplink between base station nodes and a radio network controller (RNC) node is just one example of how the traffic concentrator 40 may be utilized in a radio access network. Traffic concentrators of the type disclosed herein can be utilized in other locations and contexts, e.g., in which admission control is performed in an AAL2 network.

In similar manner as alternative D described above with reference to FIG. 4D, the user traffic is transported as ATM Adaptation Layer 2 (AAL2) connections over the unspecified bit rate (UBR) virtual channels (VCs). To this end, FIG. 6 shows two nodes $52_1$ and $52_2$ connected to virtual path $50_1$ and virtual path $50_2$, respectively. Each of the nodes 52 includes an AAL2 multiplexer 54 which multiplexes AAL2 cells for respective AAL2 connections into the ATM cells carried in the virtual channels (VCs) of the respective virtual paths (VPs). That is, node $52_1$ has AAL2 multiplexer $54_1$ which multiplexes AAL2 cells for AAL2 connections $56_{1-1}$ through $56_{1-n}$, while node $52_2$ has AAL2 multiplexer $54_2$ which multiplexes AAL2 cells for AAL2 connections $56_{2-1}$ through $56_{2-k}$.

As explained in more detail subsequently, the control node 44 is arranged to process AAL2 signaling messages which concern the AAL2 connections included in the VCs for which the ATM switch 42 performs the switching operation. Moreover, the AAL2 signaling messages are carried in virtual channels which do not carry the user traffic and which are either originated or terminated at the control node. That is, the AAL2 signaling messages are carried in different virtual channels than the virtual channels which carry the user traffic. Such signaling VCs are also herein referenced as SAAL (Signalling AAL) VCs.

The control node 44 thus serves as an endpoint for the SAAL (Signalling AAL) VCs. The nodes 52 in FIG. 6 also serve as endpoints of the SAAL (Signalling AAL) VCs. Accordingly, in addition to the AAL2 multiplexer 54, each of the nodes 52 includes an AAL2 signaling processor 57 and an AAL2 connection admission control unit 58.

The control node 44 is arranged to process AAL2 signaling messages which concern the AAL2 connections included in the VCs for which the ATM switch 42 performs the switching operation. To this end, the control node 44 preferably comprises an AAL2 signaling processor 60. The AAL2 signaling processor 60 initiates or receives the AAL2 signaling messages. In addition, control node 44 comprises a VC handling function 62 (see FIG. 7) comprising one or more VC handler units; a connection admission control (CAC) 64 comprising one or more connection admission control (CAC) units; and, an ATM consistency configuration check function 66 comprising one or more ATM consistency configuration check units.

Thus, the traffic concentrator 40 combines the AAL2 signaling processors and AAL2 resource management functions (i.e., AAL2 Connection Admission Control) with the functionality of an ATM switch such as ATM switch 42.

Returning now to the topic of AAL2 signaling, the AAL2 signaling is not done within the UBR VCs which carry user traffic. It would be very expensive and cumbersome to transport the AAL2 signaling within the VCs carrying the user traffic, since in such case the AAL2 packets containing the signaling messages would have to be demultiplexed from the VCs (and multiplexed into the VCs) much in the manner depicted in FIG. 5. Moreover, if the signaling VCs were transported in UBR VCs and in a common VP with the user-plane traffic, the connection admission control would not be able to make proper decisions.

Therefore, as explained above, the AAL2 signaling messages are transported in separate SAAL-type VCs. AAL2 signaling is designed to be signaling bearer independent, so that an operator can opt for whatever signaling bearer the operator prefers to transport the AAL2 signaling messages. The protocol architecture allowing this bearer independence is documented in ITU-T Standard Q.2630.1. In order to use a particular signaling bearer, a bearer converter is necessary for converting the generic primitives documented in Q.2630.1 into the primitives offered by a particular bearer technology. Bearer converters for SAAL and MTP3 are documented in ITU-T standards Q2150.2 and Q.2150.1. Even if SAAL is preferred, SAAL can be deployed on top of a dedicated ATM VC or on a specific AAL2 CID in the same ATM VC which carries the AAL2 payload.

Thus, the SAAL VCs do not "disturb" the user-plane traffic. These separate SAAL-type VCs can be of any service category, CBR, rt-VBR or UBR, etc. In an example illustrative implementation, the AAL2 signaling messages are preferably carried in at least one constant bit rate (CBR) virtual channel. The CBR VCs used for SAAL VCs may, however, be carried on a common VP with user traffic virtual channels (VCs).

FIG. 6 illustrates by broken lines 70 the AAL2 signaling occurring between endpoints of the SAAL (Signalling AAL) VCs. For example, broken line $70_{60-57(1)}$ represents the AAL2 signaling sent from AAL2 signaling processor 60 of control node 44 to AAL2 signaling processor $57_1$ of node $52_1$, while (in the opposite direction) broken line $70_{57(1)-60}$ represents the AAL2 signaling sent from AAL2 signaling processor $57_1$ of node $52_1$ to AAL2 signaling processor 60 of control node 44. Similarly, broken line $70_{60-57(2)}$ represents the AAL2 signaling sent from AAL2 signaling processor 60 of control node 44 to AAL2 signaling processor $57_2$ of node $52_2$, while (in the opposite direction) broken line $70_{57(2)-60}$ represents the AAL2 signaling sent from AAL2 signaling processor $57_2$ of node $52_2$ to AAL2 signaling processor 60 of control node 44. While the broken lines 70 appear to directly connect the processors 60 and 57, it will be understood that the AAL2 signaling represented by lines 70 is instead included in the appropriate SAAL VCs which are routed between nodes 52 and AAL2 signaling processor 60 via ATM switch 42. In order for the AAL2 cells which comprise the AAL2 signaling to be transported to and from control node 44, the ATM switch 42 has (at least one) outgoing switch port connected to an incoming port of control node 44, and (at least one) incoming switch port connected to an outgoing port of control node 44. The connections between the aforementioned ports of ATM switch 42 and control node 44 are represented by lines 72.

The signaling VCs from nodes 52 are routed to control node 44. The control node 44 terminates these signaling VCs, and originates new signaling VCs (carried by $VP_3$ in the FIG. 6 illustration) towards the next signaling hop (control node or AAL2 end-point). These new signaling VCs are then also switched by the ATM switch en route to the next signaling hop.

Figure 1:
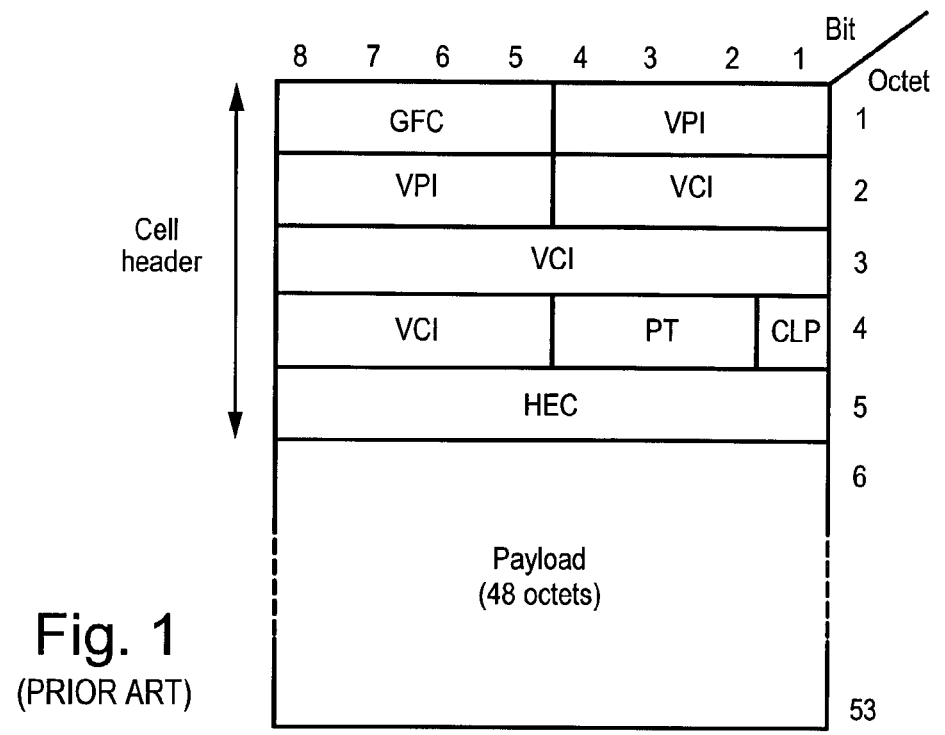
FIG. 1 is a diagrammatic view showing the format of an ATM cell.
Figure 2:
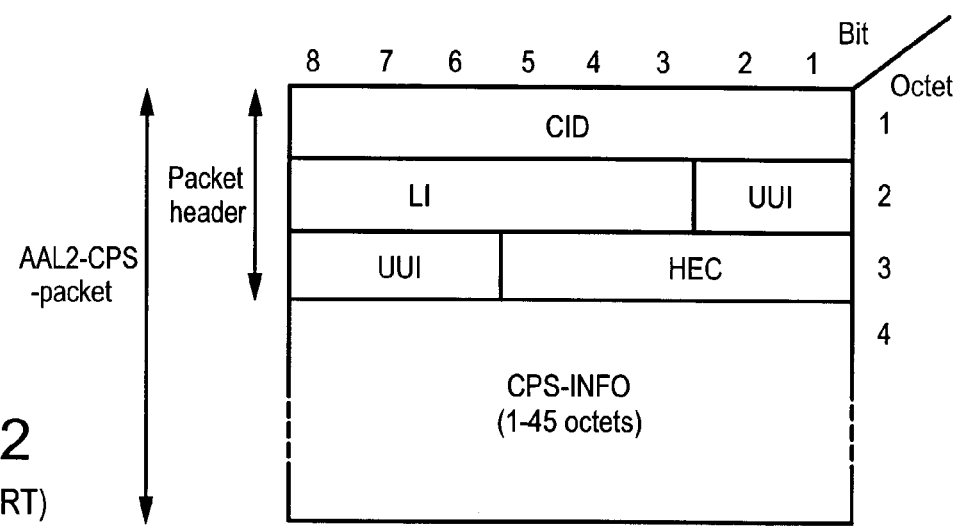
FIG. 2 is a diagrammatic view showing the format of an AAL2 packet.
Figure 3:
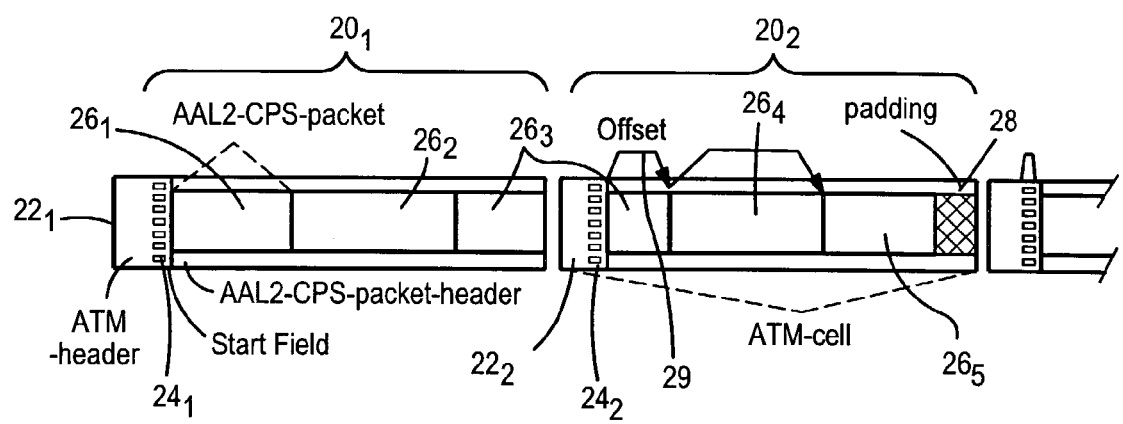
FIG. 3 is a diagrammatic view showing plural AAL2 packets in ATM cells.
Figure 5:
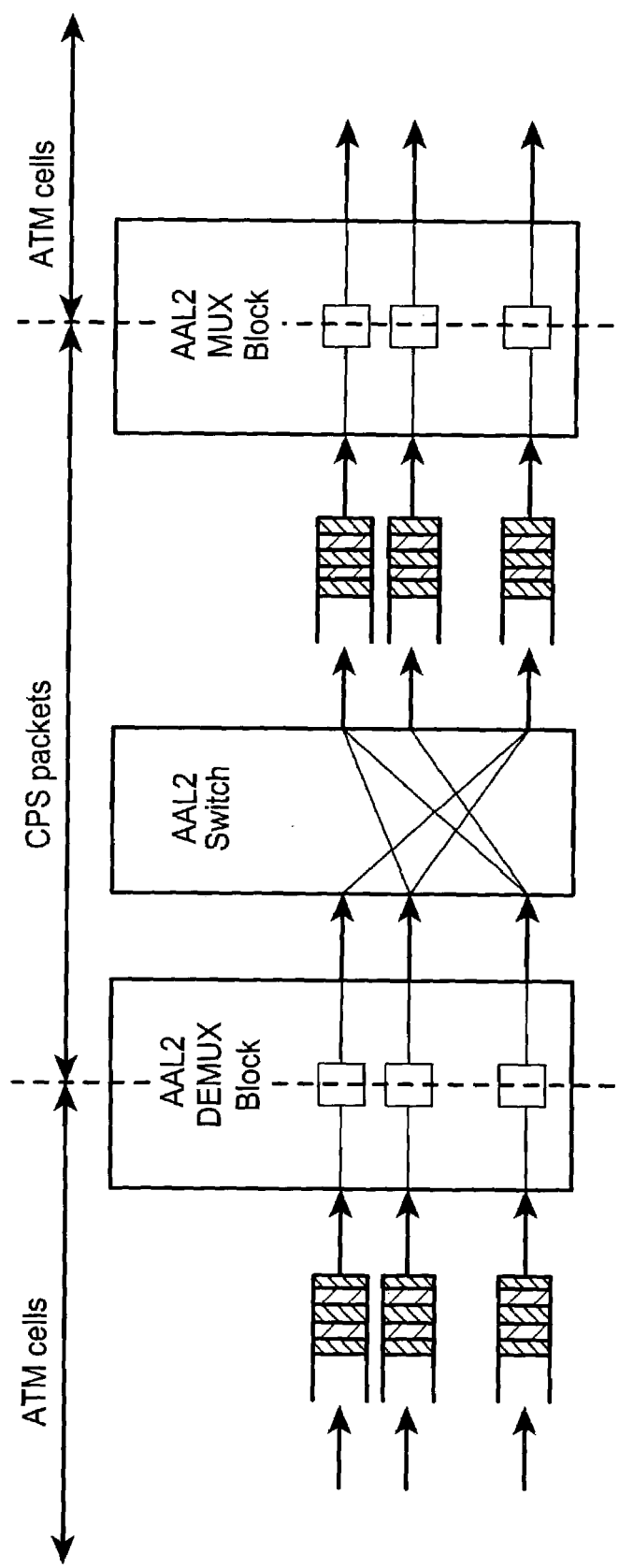
FIG. 5 is a diagrammatic view showing an AAL2 switch which is preceded by an AAL2 multiplexer and an AAL2 demultiplexer.

The AAL2 protocol is described in the ITU Q.2630.1 Recommendation. For example, Table 7-5 of the ITU Q.2630.1 Recommendation provides a list of AAL2 signaling messages; FIG. 5-1 of the ITU Q.2630.1 Recommendation illustrates AAL2 signaling protocol reference architecture. The AAL2 type signaling protocol provides the signaling capability to establish, release and maintain AAL type 2 point-to-point connections across a series of ATM VCCs that carry AAL type 2 links. These services are accessible via the AAL type 2 served user service access point (A2SU-SAP). The AAL type 2 signaling protocol also provides maintenance functions associated with the AAL type 2 signaling. An AAL type 2 signaling endpoint can control AAL type 2 links on more than one AAL type 2 path. These AAL type 2 paths may be contained on different ATM VPCs (Virtual Path Connections), which in turn may be carried on different ATM physical interfaces. Two peer AAL type 2 signaling entities rely on the generic signaling transport service to provide assured data transfer between them and service availability indications. These services are accessible via the Generic Signaling Transport Service Access Point (GST-SAP). Primitives over the A2SU-SAP, GST-SAP, and LM-SAP are used for descriptive purpose only, and do not imply a specific implementation. Both peer AAL type 2 signaling entities provide the same set of services. The AAL type 2 signaling entity is subdivided into protocol entities and nodal functions (as shown in FIG. 5-1 of the ITU Q.2630.1 Recommendation). At each AAL type 2 service endpoint, the AAL type 2 signaling entity communicates with the AAL type 2 served user. At an AAL type 2 switch, the AAL type 2 signaling entity does not communicate with an AAL type 2 served user.

Turning again to certain constituent elements of traffic concentrator 40, the person skilled in the art will appreciate the general structure and operation of ATM switch 42, examples of which have already been referenced. In FIG. 6, the ATM switch 42 concentrates the traffic of VP1 and VP2, with the concentration being supervised or controlled by the control node 44.

In FIG. 6, the AAL2 signaling processors interpret and generate AAL2 messages. At control node 44, AAL2 signaling processor 60 initiates/receives and processes the AAL2 signaling messages (such as those listed in the Table 7-5 of the ITU Q.2630.1 Recommendation) which are carried over the SAAL VCs. The AAL2 signaling processor 60 is a logically different unit than other functionalities of control node 44, although these functionalities may be performed by the same processor as AAL2 signaling processor 60. The AAL2 signaling processor 60 works in conjunction with other functions of control node 44, such as connection admission control (CAC) 64. For example, at connection setup request (i.e., when the "Establish request"—ERQ message is sent along the AAL2 signaling path), the AAL2 signaling processor 60 receiving an ERQ asks the AAL2 CAC 64 to perform admission control. The answer of the AAL2 CAC 64 is either an acceptance of the connection or (in the case of insufficient resources) a rejection of the connection.

Each of the plural virtual paths involved in the switching operation is served by one of the connection admission control (CAC) units comprising connection admission control (CAC) 64. The connection admission control (CAC) function 64 makes decisions regarding allocation of resources in a transport network. To ensure quality of service (QoS) requirements, AAL2 connection admission control (CAC) is executed before a new AAL2 connection is set up in the system. Connection admission decisions are made based on traffic descriptors and QoS requirements assigned to the connections. AAL2 admission control allocates resources (VC and VP resources) for AAL2 connections in the transport network. If the amount of resources is not sufficient for accommodating a new connection, the connection is rejected. Typically, if AAL2 connections are transported in end-to-end VCs with resource allocation, AAL2 CAC is executed only at the end point of the VCs. If the resources along the path of an AAL2 connection are not allocated end-to-end, CAC decisions are made up of hop-by-hop link admission control (LAC) decisions. In the UBR VC case, AAL2 connections are transported in end-to-end UBR VCs, but still, given that concentrator points exist in the network, CAC has to be executed in these points too (not only at the end-points).

Each of the plural virtual paths involved in the switching operation is served by one of the ATM consistency configuration check units comprising ATM consistency configuration check function 66. The ATM consistency configuration check function 66 ensures that switching occurs between appropriate virtual channels (VCs). In the particular situation depicted in FIG. 6, the ATM switch 42 in the concentrator 40 has to inform the AAL2 CAC 64 in the control node 44 about the ATM VC/VP configuration. Specifically, the ATM switch 42 has to inform the AAL2 CAC 64 which VCs will use $VP_3$, and what is the capacity of $VP_3$ that is available for these VCs. If the person who sets the ATM configuration makes a mistake, and mixes VCs carrying AAL2 connections (controlled by the CAC 64) with not CBR VCs not carrying AAL2 connections (not controlled by the CAC 64), the QoS may not be guaranteed by the CAC 64. It is for the purpose of avoiding such situations that the ATM Configuration Consistency Check function 66 is implemented in the control node 44. The ATM consistency configuration check function 66 detects and sends an alert regarding a wrong configuration, if it is not ensured that AAL2 connections controlled by the CAC 64 are multiplexed over a CBR resource.

As evident from the foregoing, the bandwidth management functions for AAL2 connections reside in control node 44. The control node 44 has the ability to receive and send AAL2 signaling messages. The AAL2 signaling traffic is transported on a separate CBR VC (separate from user plane traffic). The control node 44 performs consistency check of the ATM configuration and provides a notification if the configuration is incorrect. If the ATM switch or a VC goes down, the AAL2 endpoints realize or know it, and upon such realization send a state reset to the control node 44. The control node 44 in such case is able to connect to many ATM switches, and the AAL2 signaling among the AAL2 bandwidth management entities associated with those ATM switches is implemented in software within the control node 44.

Figure 7:
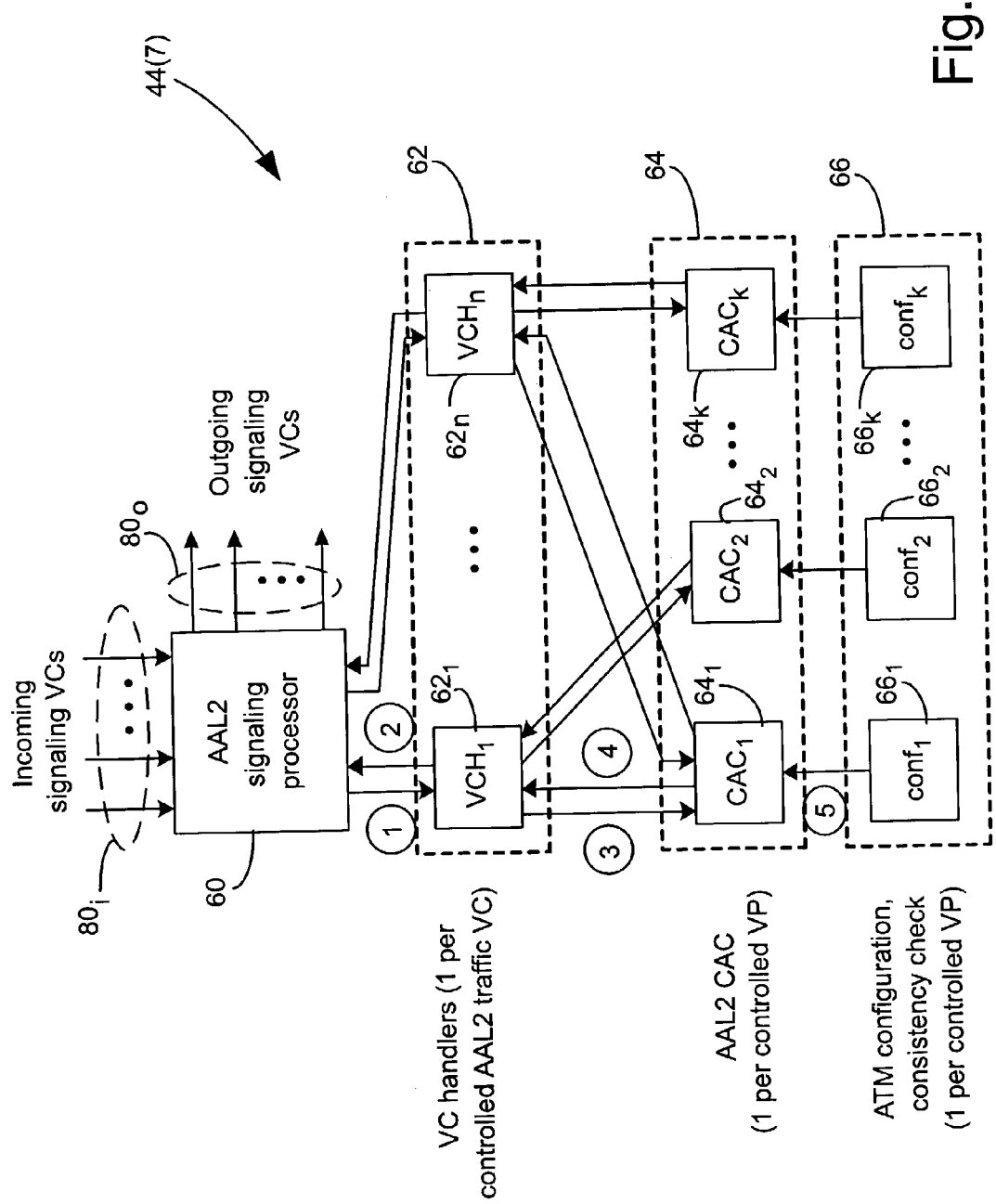
FIG. 7 is a diagrammatic view of a particular, non-limiting example implementation of a control node of a concentrator.

FIG. 7 is a diagrammatic view of a particular, non-limiting example implementation of a control node 44(7) of a concentrator. The example control node 44(7) of FIG. 7 controls n number of VCs and k number of VPs. The control node 44(7) comprises AAL2 signaling processor 60. The AAL2 signaling processor 60 has one or more ports $80_i$ for receiving incoming SAAL VCs and one or more ports $80_o$ for transmitting outgoing SAAL VCs. The VC handling function 62 of control node 44(7) comprises n number of VC handling units $62_1$ through $62_n$, with each of the plural virtual channels involved in the switching operation being handled or managed by one of the VC handling units. The VC handling units store configuration information, knowing which VC is mapped onto which VP. Thus, if a request arrives, the VC handling units invoke the appropriate connection admission control (CAC) unit(s), receive a response (either acceptance or rejection) from the connection admission control (CAC) unit(s), and then send an accept or reject message as appropriate.

The connection admission control (CAC) unit makes decisions regarding allocation of resources in a transport network. The connection admission control (CAC) 64 of control node 44(7) has one connection admission control (CAC) unit for each VP, e.g., $CAC_1, CAC_2, \ldots CAC_k$. Each of the plural virtual paths involved in the switching operation is served by one of the connection admission control (CAC) units.

Each of the plural virtual paths involved in the switching operation is served by one of the ATM consistency configuration check units $66_1, 66_2, \ldots 66_k$ included in ATM consistency configuration check function 66. As mentioned before, the ATM consistency configuration check function 66 ensures that switching occurs between appropriate virtual channels (VCs).

Since one control node, such as control node 44(7), may control many concentrator ATM switches (as described subsequently), one VC handling unit 62 may be associated with more than one connection admission control (CAC) unit 64.

Figure 8A:
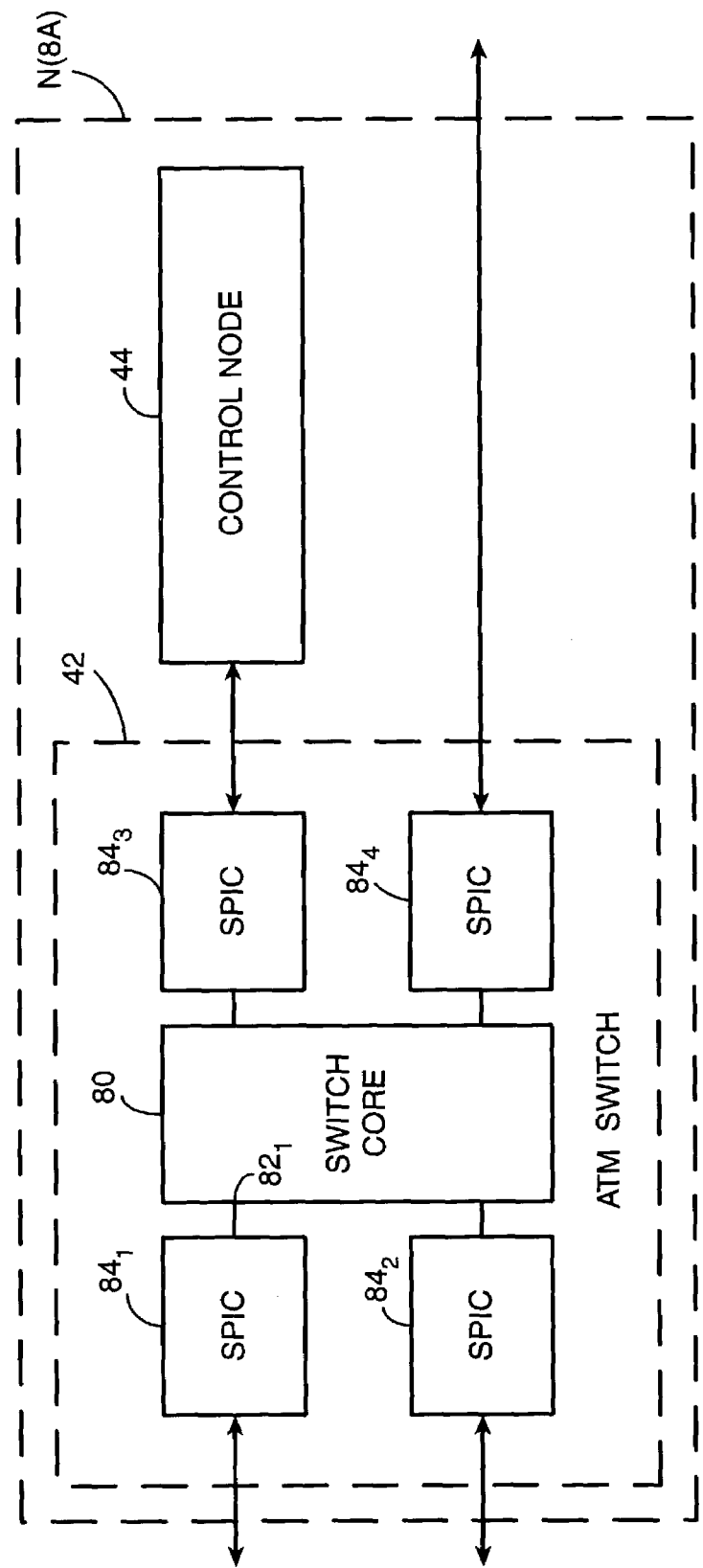
FIG. 8A, FIG. 8B, FIG. 8C, FIG. 8D, and FIG. 8E are diagrammatic views showing differing example, non-limiting configurations for situating an ATM switch and control node of a traffic concentrator.

The ATM switch and control node of the traffic concentrator may be situated in a variety of configurations. For example, and as shown in FIG. 8A, the ATM switch and control node may be co-located at a same physical node N(8A) of the radio access network. The particular ATM switch 42 shown in FIG. 8A comprises a switch core 80 having switch core ports 82. Each of the plural switch core ports 82 is connected to a switch port interface circuit (SPIC) 84, the plural switch port interface circuits (SPICs) 84 also forming a part of ATM switch 42. Each switch port interface circuit 84 can be realized by a board connected by a bidirectional link to a corresponding port 82 of the switch core, with the board having appropriate hardware in accordance with the functions performed by the particular switch port interface circuit 84. In FIG. 8A, one of the switch port interface circuits 84, i.e., switch port interface circuit $84_3$, is connected to control node 44. Thus, both ATM switch 42 and control node 44 are located at a same physical node N(8A) of the radio access network.

FIG. 8A and other figures do not attempt to provide a detailed depiction of ATM switch 42, nor of the switch port interface circuits (SPICs) 84. It will be appreciated that (for illustration purposes only) four switch port interface circuits 84 are shown in FIG. 8A, and that the number of switch port interface circuits 84 is not limited by this illustration. Details of the switch core 80 and switch port interface circuits (SPICs) 84 are known to those skilled in the art, some examples having already been cited.

Figure 8B:
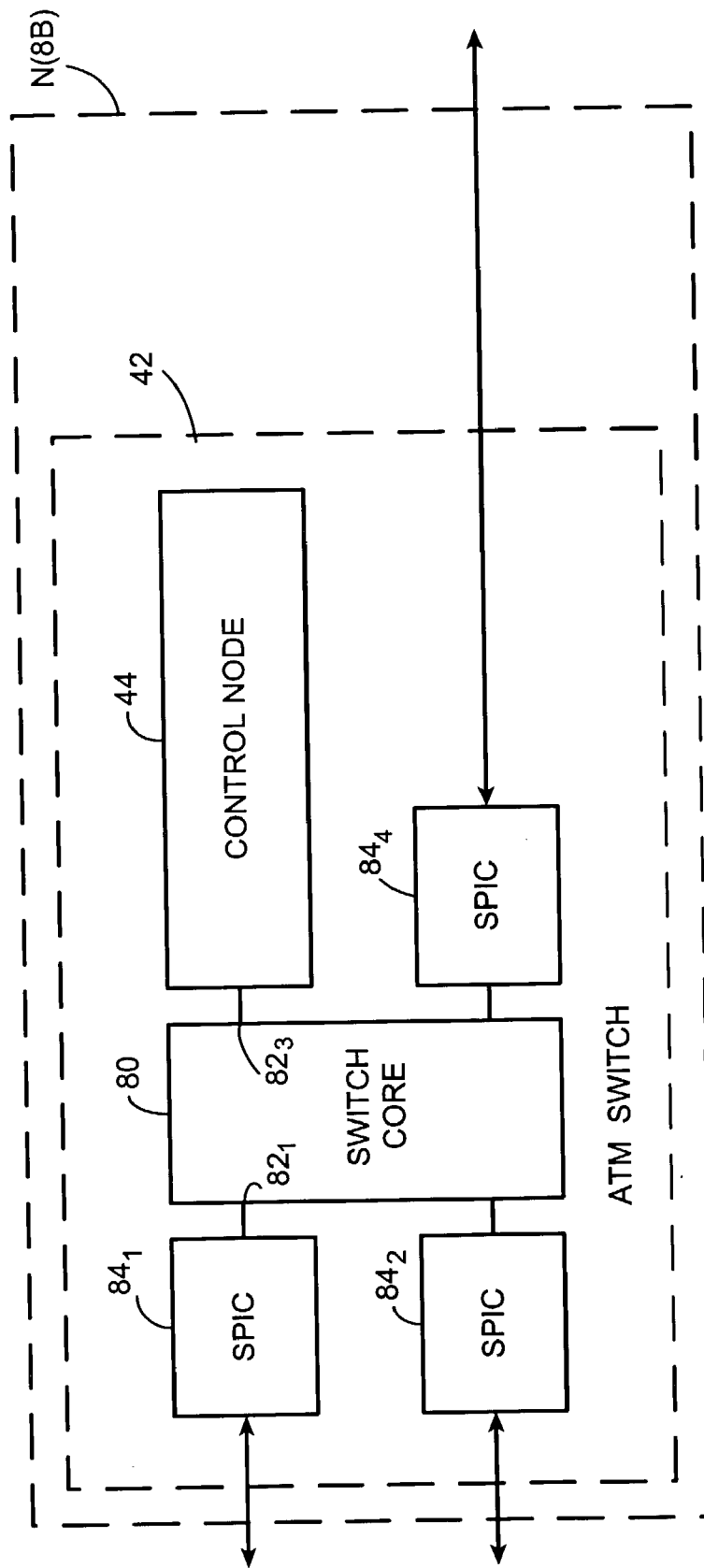

Not only may the ATM switch 42 and control node 44 be co-located at the same physical node of a radio access network, but (as shown in FIG. 8B) the control node 44 may reside on a board connected to appropriate switch ports of the ATM switch. The board comprising the control node 44 is connected to an outgoing switch port of switch core 80 and an incoming switch port of switch core 80, each such pair of switch core ports being referenced as 82 in FIG. 8B. The board on which control node 44 resides is particularly connected to switch core ports $82_3$ in FIG. 8B.

Figure 8C:
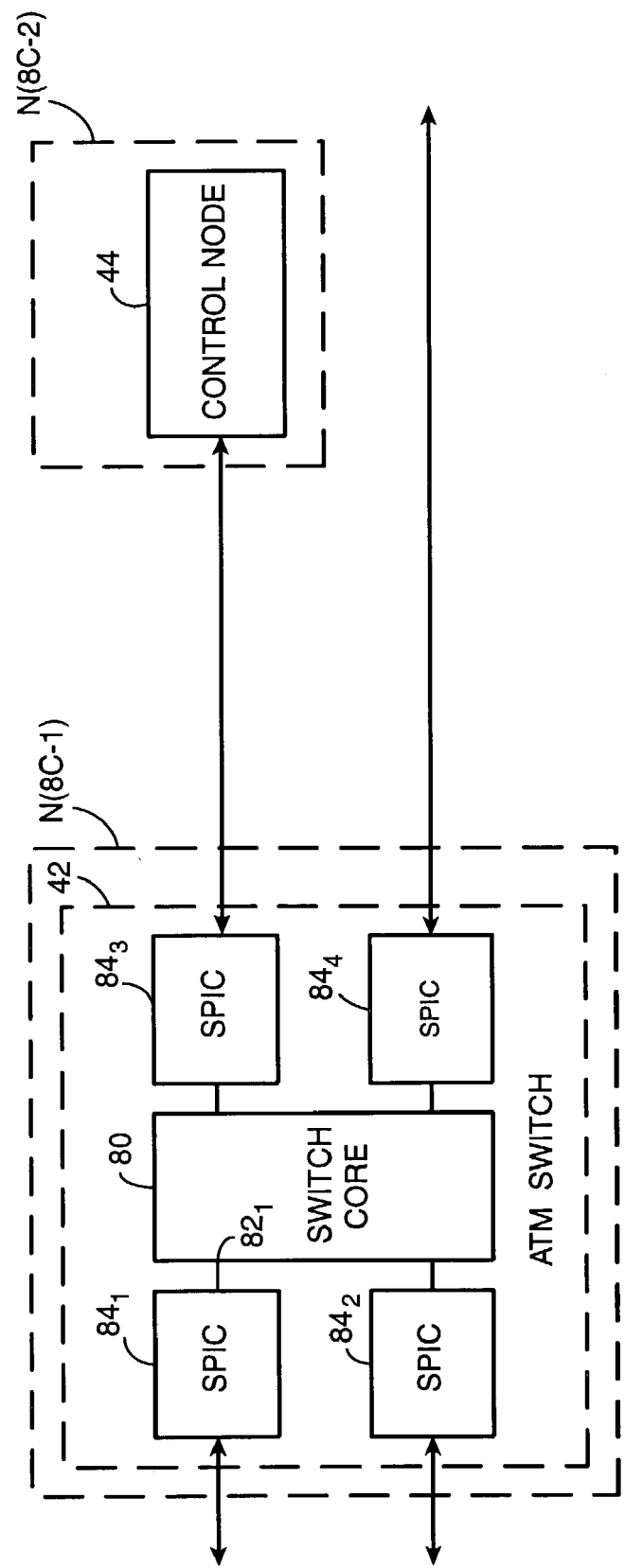

As yet another alternative, the ATM switch 42 and control node 44 may reside at differing physical nodes of the radio access network. For example, FIG. 8C shows ATM switch 42 residing at network node N(8C-1), while the control node 44 resides at a physically distinct network node N(8C-2). The network nodes N(8C-1) and N(8C-2) are not necessarily neighboring nodes, as intermediate nodes such as other switches may be connected therebetween.

In an alternate configuration, one control node may actually comprise plural traffic concentrators by serving plural concentrator-included ATM switches. For example, control node 44(8D) of FIG. 8D may serve both ATM switch 42-1 and ATM switch 42-2. In this configuration, control node 44(8D) working together with ATM switch 42-1 may function as a first concentrator 40-1 (8D), while control node 44(8D) working together with ATM switch 42-2 may function as a second concentrator 40-2(8D).

Figure 8D:
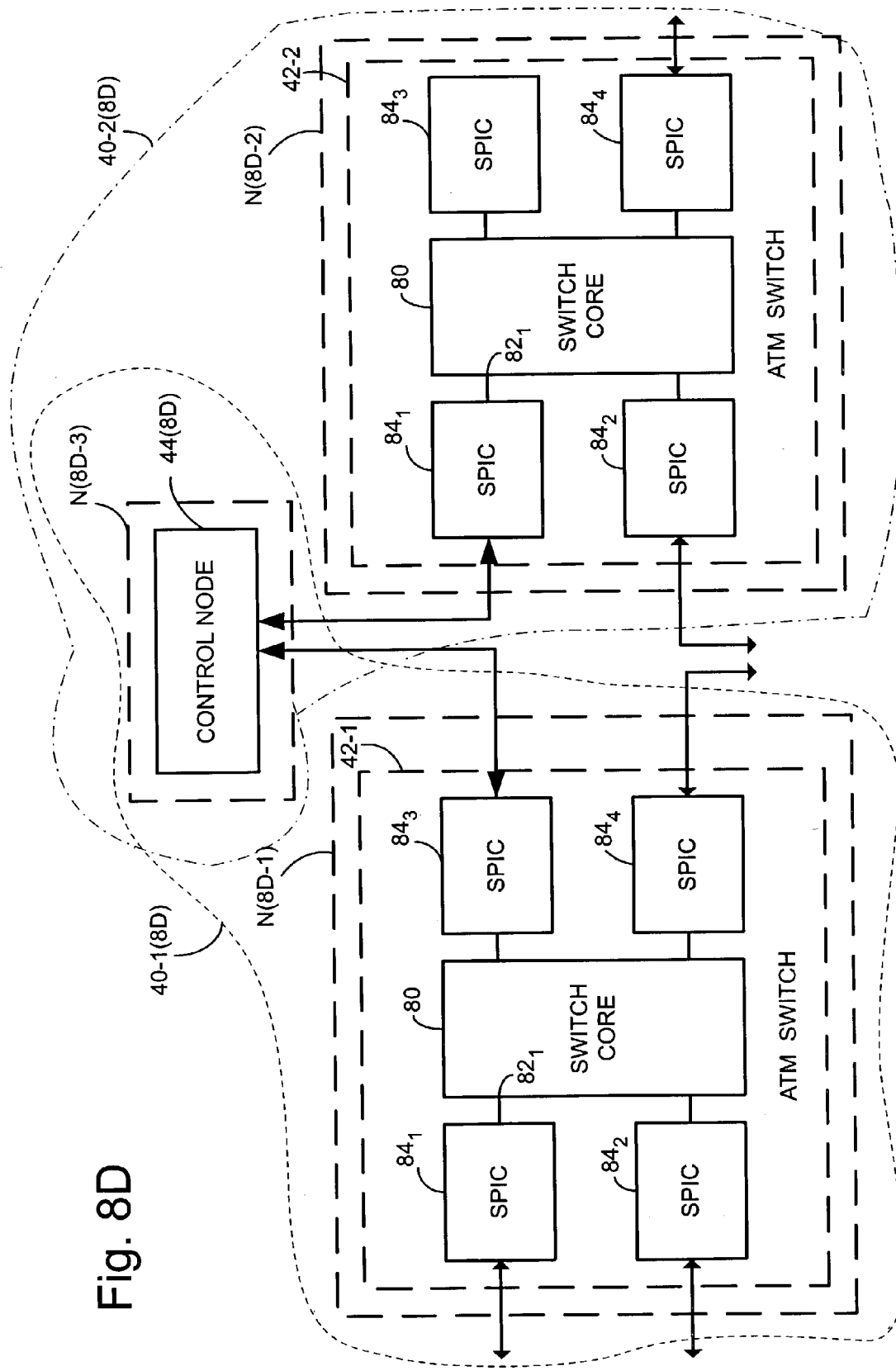
Figure 8E:
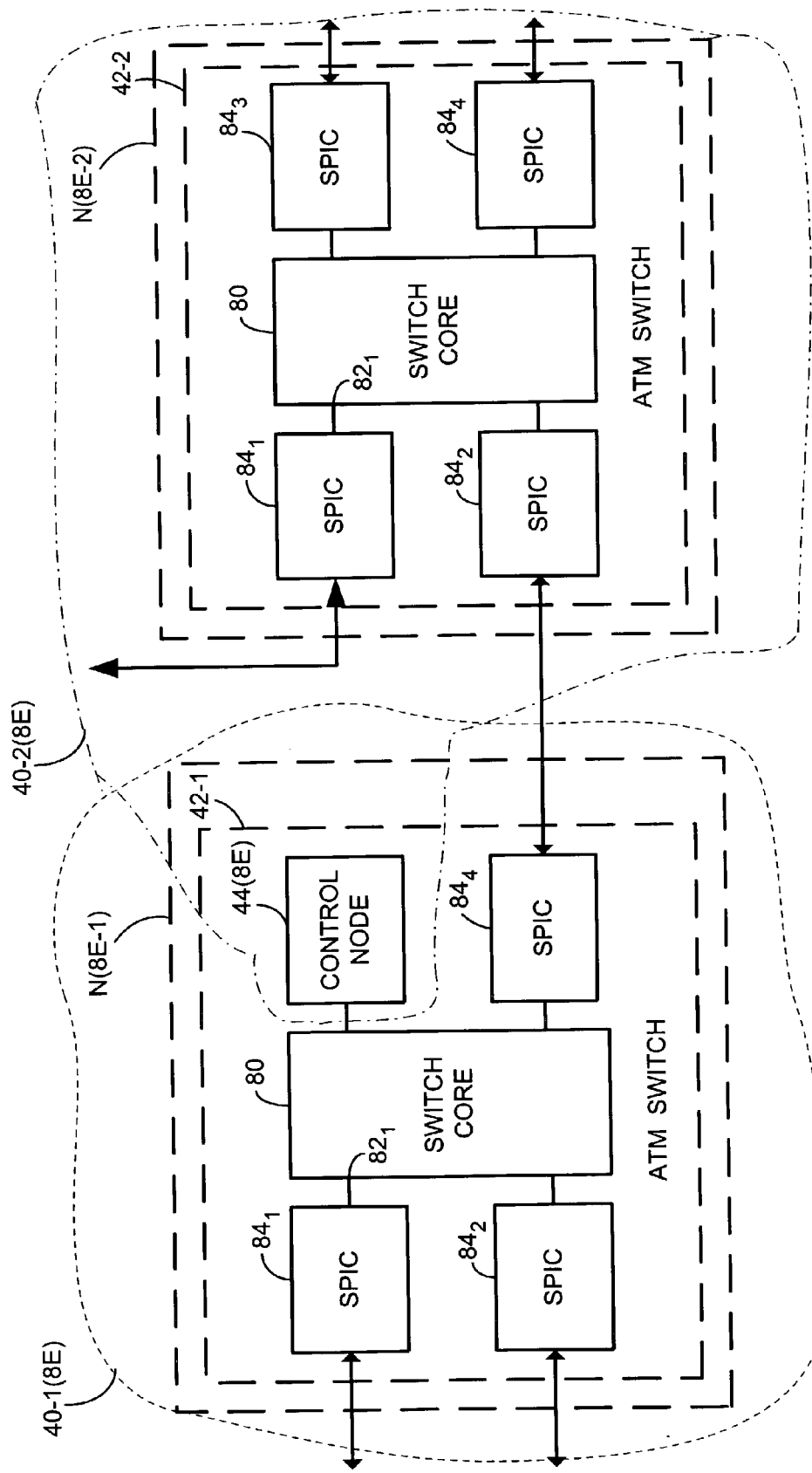

In the configuration shown in FIG. 8D, ATM switch 42-1 is physically situated at network node N(8D-1) and ATM switch 42-2 is physically situated at network node N(8D-2). The control node 44(8D) is shown in example fashion as being situated at yet another network node, i.e., node N(8D-3). Such nodular distribution is merely an example, it being understood that other variations are also possible. For example, in FIG. 8E the control node 44(8E) is situated physically at network node N(8E-1) in like manner as FIG. 8E, and yet control node 44(8E) functions with ATM switch 42-1 of FIG. 8E to constitute a first concentrator 40-1 (8E) and with ATM switch 42-2 of FIG. 8E to constitute a second concentrator 40-2(8E).

The control nodes thus perform connection admission control (CAC) with respect to virtual paths (VPs) which originate from the ATM switch with which the control node is paired to form a traffic concentrator. For example, the control node 44 of FIG. 6 performs connection admission control (CAC) with respect to virtual path $50_3$ which originates from ATM switch 42. As an enhanced optional capability, the control nodes may be able to perform connection admission control with respect to virtual paths (VPs) in addition to those which originate from the ATM switch with which the control node is paired to form a traffic concentrator.

Figure 9A:
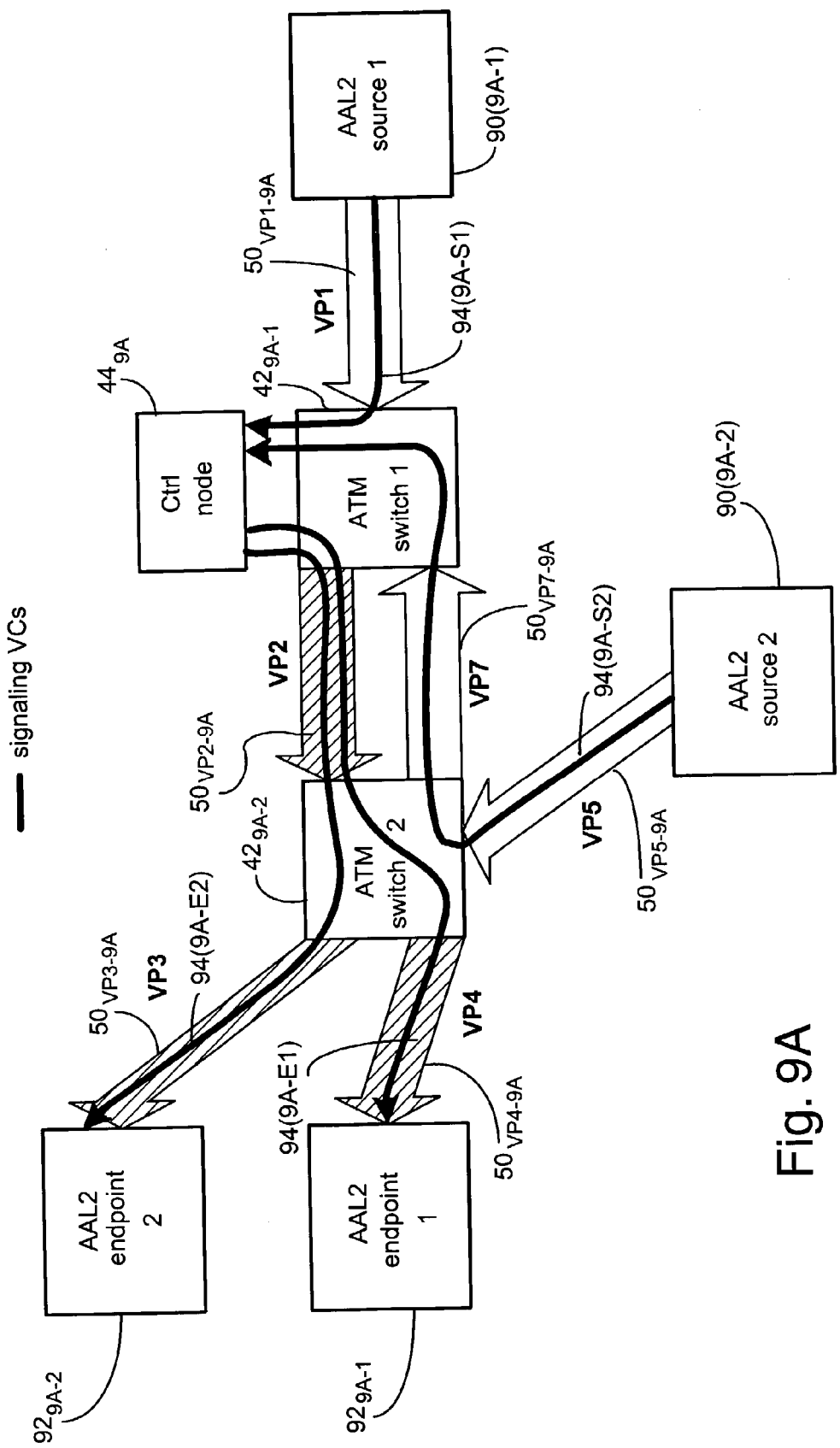
FIG. 9A is a diagrammatic view showing a configuration in which a control node has the ability to perform connection admission control (CAC) with respect to virtual paths (VPs) which originate from an ATM switch with which the control node is not paired to form a traffic concentrator, and thus contrasts with FIG. 9B which is a diagrammatic view showing a configuration in which a control node has the ability to perform connection admission control (CAC) only with respect to virtual paths (VPs) which originate from an ATM switch with which the control node is paired to form a traffic concentrator.

In the above regard, in FIG. 9A control node 44(9A) is responsible for guaranteeing QoS (i.e. running CAC) in VP2, VP3 and VP4. It is to be noted that virtual path $50_{VP3-9A}$ and virtual path $50_{VP4-9A}$ originate from ATM switch $42_{9A-2}$, and that control node 44(9A) is not paired with ATM switch $42_{9A-2}$ for forming a concentrator node (rather, control node 44(9A) is paired with ATM switch $42_{9A-1}$). FIG. 9A illustrates two AAL2 sources, i.e., AAL2 source 90(9A-1) and AAL2 source 90(9A-2). AAL2 source 90(9A-1) is connected by virtual path $50_{VP1-9A}$ to ATM switch $42_{9A-1}$; AAL2 source 90(9A-2) is connected by virtual path $50_{VP5-9A}$ to ATM switch $42_{9A-2}$. Two AAL2 endpoints, i.e., AAL2 endpoint $92_{9A-1}$ and AAL2 endpoint $92_{9A-2}$ are connected by virtual paths $50_{VP4-9A}$ and $50_{VP3-9A}$, respectively, to ATM switch $42_{9A-2}$. The ATM switch $42_{9A-1}$ sends cells over virtual path $50_{VP2-9A}$ to ATM switch $42_{9A-2}$, while cells are carried in the opposite direction between ATM switch $42_{9A-1}$ and ATM switch $42_{9A-2}$ over virtual path $50_{VP7-9A}$.

As shown by the arrowhead lines in the FIG. 9A embodiment, the AAL2 source 90(9A-1) and AAL2 source 90(9A-2) both must have a signaling connection with the control node $44_{9A}$. In this regard, FIG. 9A shows signaling connection 94(9A-S1) from AAL2 source 90(9A-1) to control node $44_{9A}$, and signaling connection 94(9A-S2) from AAL2 source 90(9A-2) to control node $44_{9A}$. Further, control node $44_{9A}$ must have a signaling connection towards the AAL2 endpoints of the AAL2 traffic of these connections (e.g., AAL2 endpoint $92_{9A-1}$ and AAL2 endpoint $92_{9A-2}$). FIG. 9A shows signaling connection 94(9A-E1) from control node $44_{9A}$ to AAL2 endpoint $92_{9A-1}$; and signaling connection 94(9A-E2) from control node $44_{9A}$ to AAL2 endpoint $92_{9A-2}$.

In the FIG. 9A example, the signaling VCs are transmitted within the same VP as the AAL2 user traffic. For simplicity, some of the signaling VCs and Traffic VPs in the backward direction are not depicted, it being understood that the backward signaling VCs must follow the same direction backwards.

In the FIG. 9A configuration, when a connection establish request arrives from an AAL2 source (e.g., AAL2 source 90(9A-1) or AAL2 source 90(9A-2)) to the control node $44_{9A}$, the control node $44_{9A}$ runs connection admission control (CAC) for all corresponding VPs. In other words, if a request arrives from AAL2 source 90(9A-1) to AAL2 endpoint $92_{9A-1}$, for example, CAC is executed by control node $44_{9A}$ for VP2 and VP4.

Figure 9B:
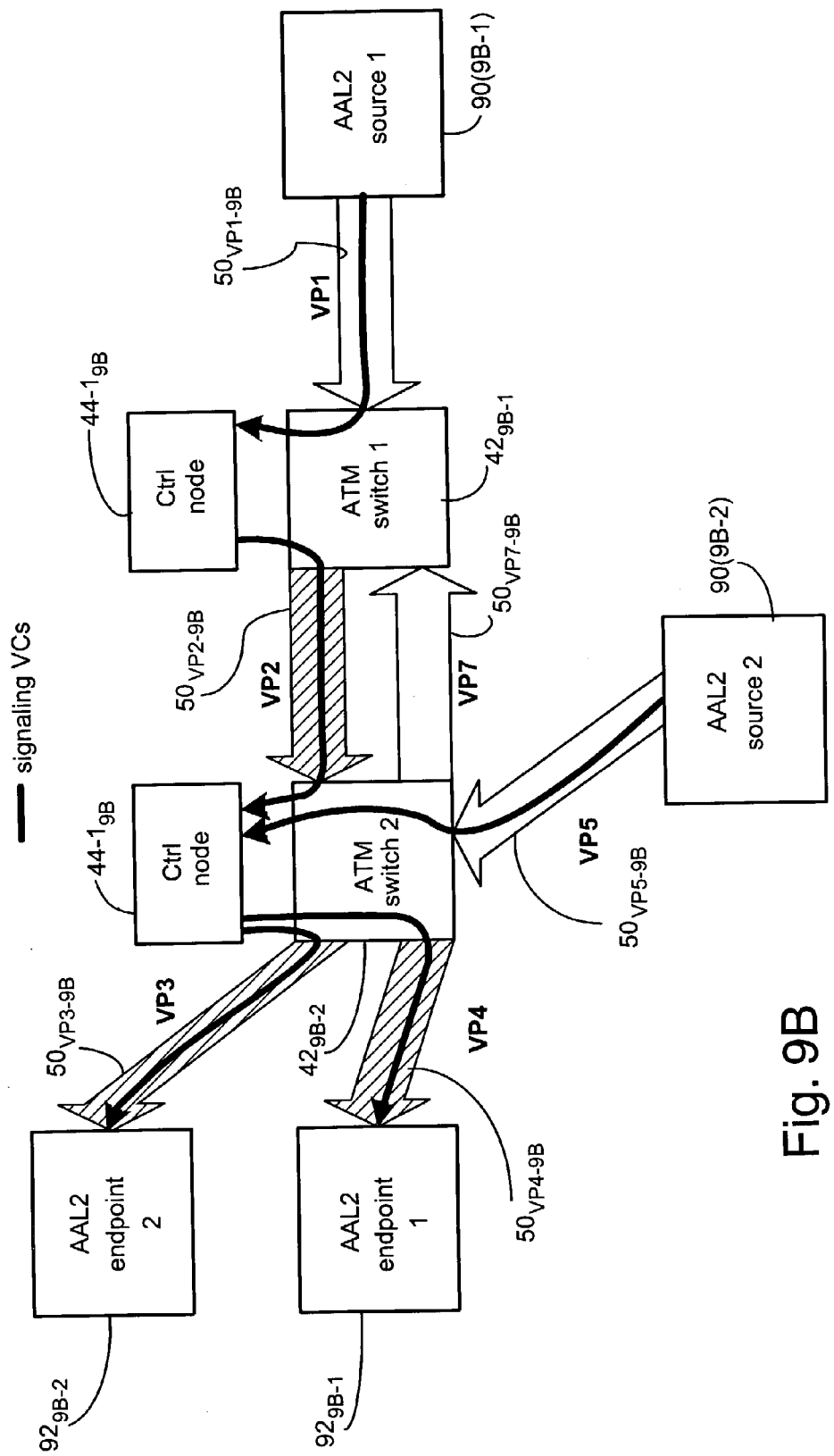

FIG. 9B illustrates a situation which contrasts with FIG. 9A, i.e., the control node 44(9B) is not given responsibility or ability to perform connection admission control (CAC) for virtual path $50_{VP3-9A}$ and virtual path $50_{VP4-9A}$ (the virtual paths (VPs) which originate from ATM switch $42_{9A-2}$). Thus, in FIG. 9B, control node 44(9B) performs connection admission control only for VPs originated from its associated ATM switch (e.g., VPs which originated from ATM switch $42_{9A-1}$).

The FIG. 9A and FIG. 9B scenarios are transparent for the AAL2 sources AAL2 source 90 and endpoints 92. In the FIG. 9A scenario (in which only one control node 44(9A) is needed) the control node may perform connection admission control for more than one VP when the control node 44(9) receives a connection establishment request.

Each of the FIG. 9A and FIG. 9B scenarios have advantages and disadvantages. For example, the FIG. 9A scenario has the advantage of requiring just one control node, with the concomitant advantages of less hardware and a smaller number of signaling messages generated. Note, by way of contrast with the FIG. 9A scenario, that with the FIG. 9B scenario there is an additional signaling VC (which goes through VP2). The FIG. 9A scenario "emulates" this extra VC by execution two connection admission control operations, and is especially advantageous in case of tree topology (e.g. the control traffic does not have to by-pass like in the case of the second AAL2 source). The FIG. 9B scenario is advantageous from the standpoint of minimizing the number of signaling VCs per VP (e.g. on VP2 there is one VC instead of two VCs; on VP7 there are no signaling VCs).

From the foregoing it will be appreciated that using a single control node to serve in conjunction with more than one ATM switch has repercussions from the perspective of a signaling entity. These repercussions involve, for example, how connection admission control procedures are related (e.g., more than one connection admission control procedure may be invoked for one connection establishment). One hop in the user plane (one VC link) can be many hops in the signaling (control) plane It may occur, in some implementations (such as the control node being a standalone box), that the internal interface to the ATM layer management (LM) plane is lost, because the primitives are not sent out to the network. For example, if there is a failure in the ATM switch controlled by a control node, there are no internal LM primitives to ask the control node to initiate resets towards signaling peers. This is not, however, a significant problem, and a control node can function without such internal interface capability. The ATM VC end-points will know about the error, and the ATM VC end-points advise the AAL2 end-points, which in turn can initiate resets.

Figure 4:
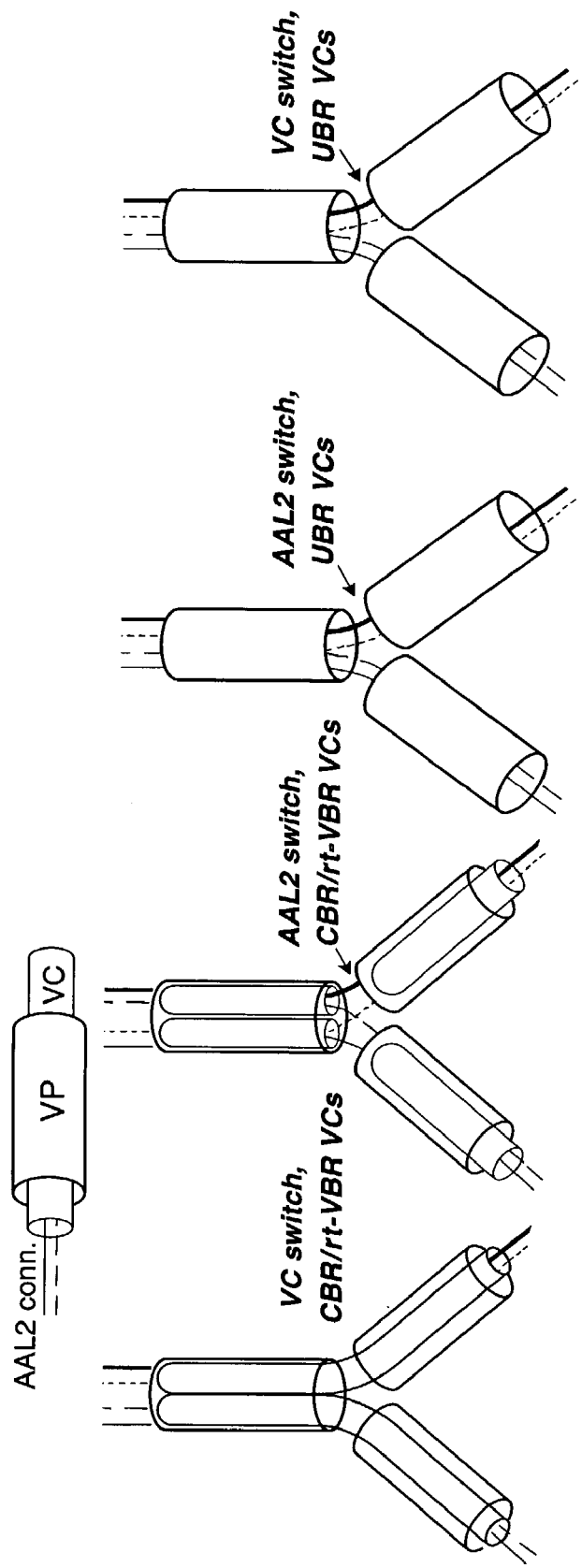
FIG. 4A-FIG. 4D are diagrammatic views of differing switching alternatives.

The foregoing embodiments and scenarios show implementations of the switch alternative D which was initially described, e.g., with reference to FIG. 4D. The same AAL2 connection admission control method can be used for alternative D as is used for alternative C (AAL2 switching, depicted in FIG. 4C), because AAL2 connection admission control over the VP resource in case of alternative D results in approximately the same resource allocation as the AAL2 connection admission control over the VP resource in case of alternative C.

Figure 10:
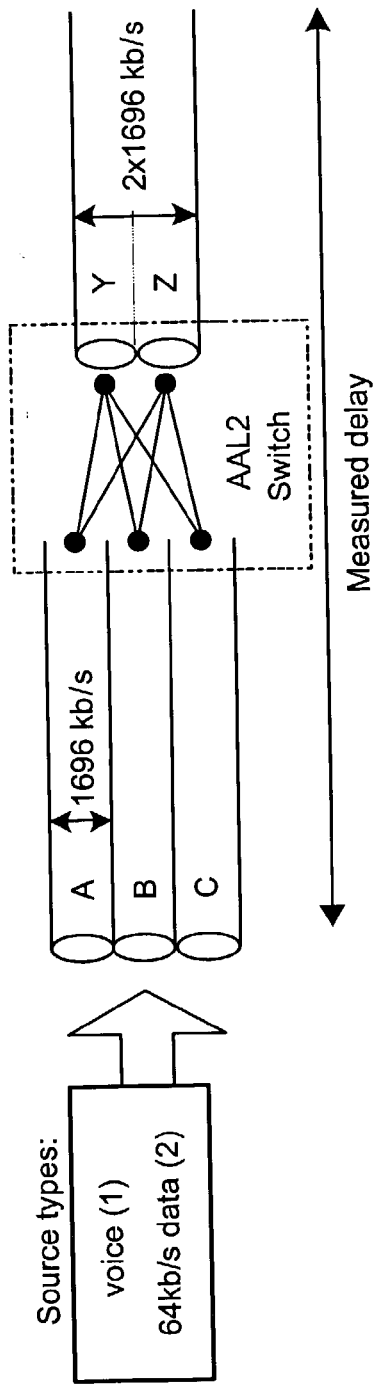
FIG. 10 and FIG. 11 are schematic views showing topologies for illustrating performance of differing switching alternatives.

To demonstrate the foregoing, FIG. 10 shows a scenario utilizing switching alternative C of FIG. 4C (thereby having an AAL2 switch) and traffic descriptors of considered traffic classes (source types) found in Table 1. In Table 1, the SSCS level bitrate is calculated as: Activity•Packet Size•8/TTI. In UTRAN, the packet size, the activity and the TTI are the traffic descriptors of an AAL2 connection. The packets are sent periodically, and the period is called the transmission time interval (TTI). TTI is basically a radio interface parameter, but the effect is that in the transport network also periodic traffic has to be transported, and therefore the traffic descriptors, CAC, etc., are designated for periodic traffic.

TABLE 1

| ID | Name | Packet size | activity | TTI | SSCS level bitrate |
|---|---|---|---|---|---|
| 1 | Voice | 39 byte | 0.55 | 20 ms | 8.58 kb/s |
| 2 | 64 kb/s data | 173 byte | 1 | 20 ms | 69.2 kb/s |

In the FIG. 10 scenario, AAL2 traffic flows (connections) are transported in different VCs. In case of AAL2 switching, flows from VCs A, B and C (see FIG. 10) are switched to VCs Y and Z. The number of connections in the simulations with AAL2 switching (alternative C) for the scenario of FIG. 10 is shown in Table 2. Table 2 thus shows a mix admitted by the connection admission control into UBR VPs. In the AAL2 multiplexers, the value of the multiplexing timer Tcu was set to 1 ms.

TABLE 2

| Flow comes from VC | Flow goes to VC | | | | | |
|---|---|---|---|---|---|---|
| | "Y" | | | "Z" | | |
| | Source type | | | Source type | | |
| | 1 | 2 | Σ rate | 1 | 2 | Σ rate |
| "A" | 34 | 1 | 360.9 | 40 | 1 | 412.4 |
| "B" | 32 | 1 | 343.8 | 34 | 2 | 430.1 |
| "C" | 42 | 1 | 429.6 | 39 | 1 | 403.8 |

Figure 11:
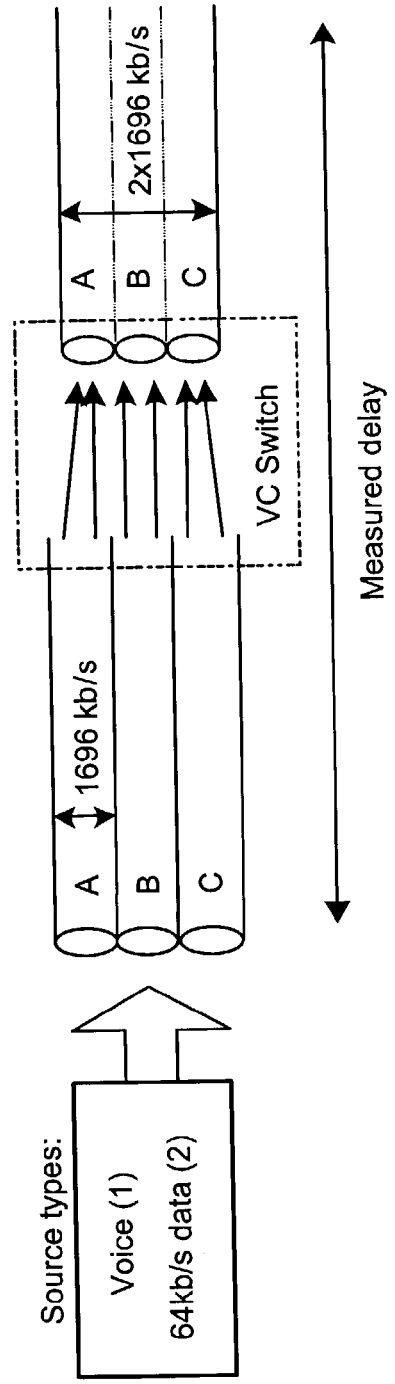
Figure 12:
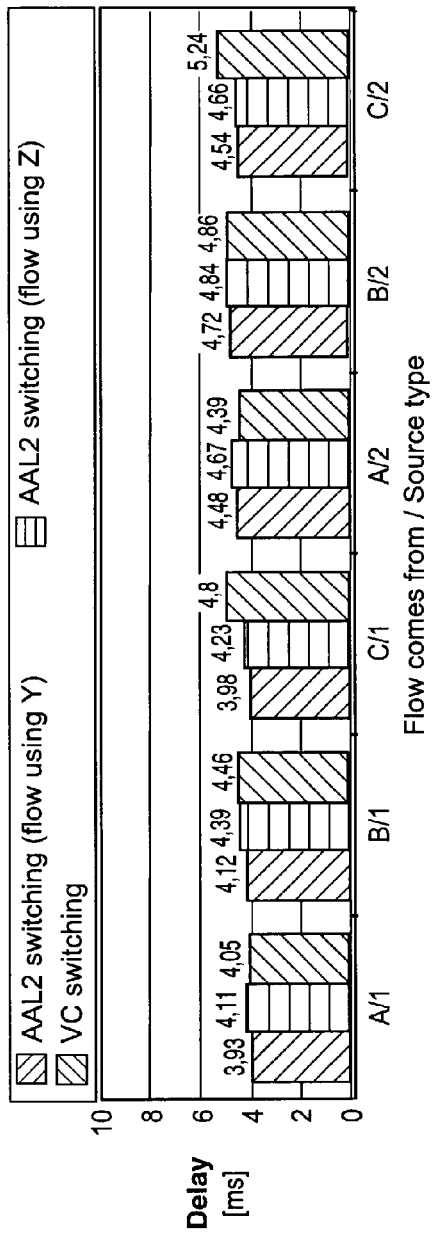
FIG. 12 and FIG. 13 are graphs showing performance results of differing switching alternatives.

In contrast to the switching alternative C shown with the example implementation of FIG. 10, FIG. 11 shows a scenario or topology of implementing switching alternative D of FIG. 4D. The graph of FIG. 12 indicate that alternatives C and D exhibit very similar performances. The y-axis of the graph of FIG. 12 shows the 0.1% quantile of the measured delay values on the different flows.

To further demonstrate the foregoing, a comparison can be made between the switching alternative B of FIG. 4B (using UBR and CBR VCs and AAL2 switching) and switching alternative D of FIG. 4D. The scenario on FIG. 10 is also applicable to this comparison, as well as the traffic descriptors in Table 1. The simulated number of connections for switching alternative B are as shown in Table 3. That is, Table 3 shows the number of sources on different flows (with reference to FIG. 10), a mix admitted by the connection admission control in CBR VCs.

Figure 13:
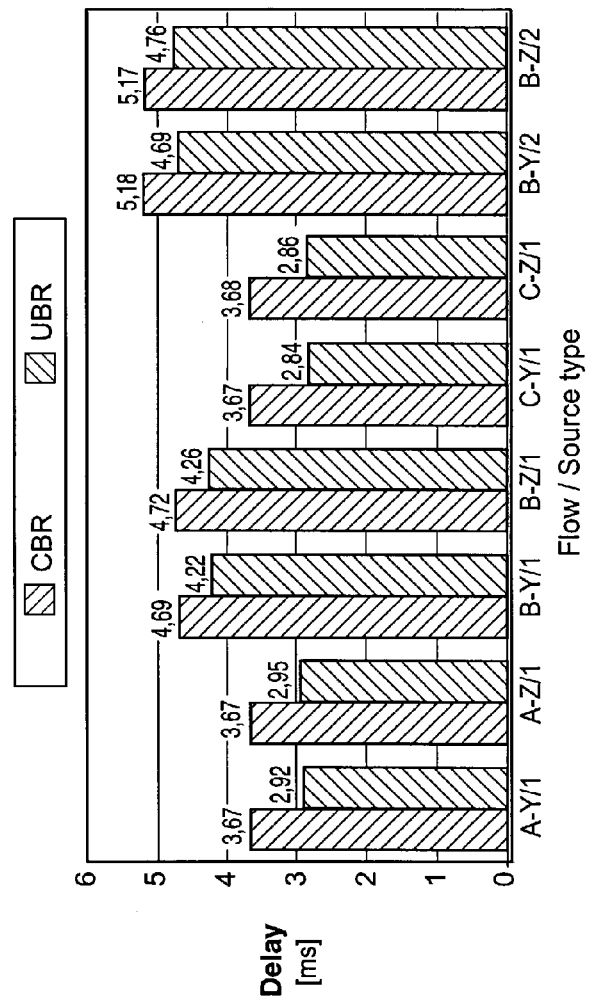

The comparative results of switching alternative B and switching alternative D are shown in FIG. 13. Since the use of CBR VCs means that the maximum bit rates are constrained per VC, if there are available resources on a VC, other VCs within the same CBR VP can not utilize these resources. Therefore it is natural that from the delay point of view the use of UBR VCs has advantages over CBR ones.

TABLE 3

| Flow comes from VC | Flow goes to VC | | | |
|---|---|---|---|---|
| | "Y" | | "Z" | |
| | Source type | | Source type | |
| | 1 | 2 | 1 | 2 |
| "A" | 35 | 0 | 50 | 0 |
| "B" | 37 | 2 | 39 | 2 |
| "C" | 42 | 0 | 25 | 0 |

The embodiments and implementations described herein avoid AAL2 switching, therefore achieving significant cost savings. Yet the QoS and the multiplexing efficiency achieved is comparable to that of AAL2 switching. Moreover, advantageously existing CAC algorithms can be reused. In some implementation scenarios, one control node can control more ATM switches. As another advantage, modifications are not needed in AAL2 signaling.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A traffic concentrator which aggregates traffic in a radio access network, the traffic concentrator comprising:

an Asynchronous Transfer Mode (ATM) switch which performs a switching operation for switching unspecified bit rate (UBR) virtual channels (VCs) carrying user traffic between plural virtual paths (VPs), the user traffic is transported as ATM Adaptation Layer 2 (AAL2) connections over the unspecified bit rate (UBR) virtual channels (VCs);

a control node associated with the ATM switch, the control node being arranged to process AAL2 signaling messages which concern the AAL2 connections included in the VCs for which the ATM switch performs the switching operation;

wherein each of the plural virtual paths involved in the switching operation has a connection admission control (CAC) unit which comprises the control node, and wherein the connection admission control (CAC) unit makes decisions regarding allocation of resources in a transport network.

2. The apparatus of claim 1, wherein the control node comprises an AAL2 signaling processor which initiates or receives the AAL2 signaling messages.

3. The apparatus of claim 1, wherein each of the plural virtual channels involved in the switching operation has a VC handler unit which comprises the control node, and wherein the VC handler stores configuration information.

4. The apparatus of claim 1, wherein the connection admission control (CAC) unit makes decisions regarding allocation of resources for a virtual path which originates from the ATM switch with which the control node is paired to form the concentrator.

5. The apparatus of claim 1, wherein the connection admission control (CAC) unit makes decisions regarding allocation of resources for a virtual path which originates from an ATM switch other than the ATM switch with which the control node is paired to form the concentrator.

6. The apparatus of claim 1, wherein the traffic concentrator aggregates traffic of plural base stations of the radio access network.

7. The apparatus of claim 1, wherein the AAL2 signaling messages are carried in virtual channels which do not carry the user traffic and which are either originated or terminated at the control node.

8. The apparatus of claim 1, wherein the AAL2 signaling messages are carried in at least one constant bit rate (CBR) virtual channel.

9. The apparatus of claim 1, wherein the control node comprises a board connected to a port of the ATM switch.

10. A traffic concentrator which aggregates traffic in a radio access network, The traffic concentrator comprising:

an Asynchronous Transfer Mode (ATM) switch which performs a switching operation for switching unspecified bit rate (UBR) virtual channels (VCs) carrying user traffic between plural virtual paths (VPs), The user traffic is transported as ATM Adaptation Layer 2 (AAL2) connections over the unspecified bit rate (UBR) virtual channels (VCs);

a control node associated with the ATM switch, the control node being arranged to process AAL2 signaling messages which concern the AAL2 connections included in the VCs for which the ATM switch performs the switching operation;

wherein each of the plural virtual paths involved in the switching operation has an ATM consistency configuration check unit which comprises the control node, and wherein the ATM consistency configuration check unit ensures that switching occurs between appropriate virtual channels (VCs).

11. A traffic concentrator which aggregates traffic in a radio access network, The traffic concentrator comprising:
- an Asynchronous Transfer Mode (ATM) switch which performs a switching operation for switching unspecified bit rate (UBR) virtual channels (VCs) carrying user traffic between plural virtual paths (VPs), the user traffic is transported as ATM Adaptation Layer 2 (AAL2) connections over the unspecified bit rate (UBR) virtual channels (VCs);
- a control node associated with the ATM switch, the control node being arranged to process AAL2 signaling messages which concern the AAL2 connections included in the VCs for which the ATM switch performs the switching operation;
- wherein the control node comprises:
  - an AAL2 signaling processor which initiates or receives the AAL2 signaling messages;
  - a VC handler unit which stores configuration information;
  - a connection admission control (CAC) unit which makes decisions regarding allocation of resources in a transport network; and
  - an ATM consistency configuration check unit which ensures that switching occurs between appropriate virtual channels (VCs).

12. The apparatus of claim 11, wherein the traffic concentrator aggregates traffic of plural base stations of the radio access network.

13. The apparatus of claim 11, wherein the AAL2 signaling messages are carried in virtual channels which do not carry the user traffic and which are either originated or terminated at the control node.

14. The apparatus of claim 11, wherein the AAL2 signaling messages are carried in at least one constant bit rate (CBR) virtual channel.

15. The apparatus of claim 11, wherein the control node comprises a board connected to a port of the ATM switch.

16. A radio access network comprising:
- plural ATM adaptation Layer 2 (AAL2) source nodes;
- an AAL2 endpoint node;
- a traffic concentrator which aggregates user traffic transmitted from the plural AAL2 source nodes to the AAL2 endpoint node, the traffic concentrator comprising:
  - an Asynchronous Transfer Mode (ATM) switch which performs a switching operation for switching unspecified bit rate (UBR) virtual channels (VCs) carrying user traffic between plural virtual paths (VPs), The user traffic being transported as ATM Adaptation Layer 2 (AAL2) connections over the unspecified bit rate (UBR) virtual channels (VCs);
  - a control node associated with the ATM switch, the control node being arranged to process AAL2 signaling messages which concern the AAL2 connections included in the VCs for which the ATM switch performs the switching operation;
  - wherein each of the plural virtual paths involved in the switching operation has a connection admission control (CAC) unit which comprises the control node, and wherein the connection admission control (CAC) unit makes decisions regarding allocation of resources in a transport network.

17. The apparatus of claim 16, wherein the control node comprises an AAL2 signaling processor which initiates or receives the AAL2 signaling messages.

18. The apparatus of claim 16, wherein each of the plural virtual channels involved in the switching operation has a VC handler unit which comprises the control node, and wherein the VC handler stores configuration information.

19. The apparatus of claim 16, wherein the connection admission control (CAC) unit makes decisions regarding allocation of resources for a virtual path which originates from the ATM switch with which the control node is paired to form the concentrator.

20. The apparatus of claim 16, wherein the connection admission control (CAC) unit makes decisions regarding allocation of resources for a virtual path which originates from an ATM switch other than the ATM switch with which the control node is paired to form the concentrator.

21. A radio access network comprising:
- plural ATM adaptation Layer 2 (AAL2) source nodes;
- an AAL2 endpoint node;
- a traffic concentrator which aggregates user traffic transmitted from the plural AAL2 source nodes to the AAL2 endpoint node, the traffic concentrator comprising:
  - an Asynchronous Transfer Mode (ATM) switch which performs a switching operation for switching unspecified bit rate (UBR) virtual channels (VCs) carrying user traffic between plural virtual paths (VPs), the user traffic being transported as ATM Adaptation Layer 2 (AAL2) connections over the unspecified bit rate (UBR) virtual channels (VCs);
  - a control node associated with the ATM switch, the control node being arranged to process AAL2 signaling messages which concern the AAL2 connections included in the VCs for which the ATM switch performs the switching operation;
  - wherein each of the plural virtual paths involved in the switching operation has an ATM consistency configuration check unit which comprises the control node, and wherein the ATM consistency configuration check unit ensures that switching occurs between appropriate virtual channels (VCs).

22. A radio access network comprising:
- plural ATM adaptation Layer 2 (AAL2) source nodes;
- an AAL2 endpoint node;
- a traffic concentrator which aggregates user traffic transmitted from the plural AAL2 source nodes to the AAL2 endpoint node, the traffic concentrator comprising:
  - an Asynchronous Transfer Mode (ATM) switch which performs a switching operation for switching unspecified bit rate (UBR) virtual channels (VCs) carrying user traffic between plural virtual paths (VPs), the user traffic being transported as ATM Adaptation Layer 2 (AAL2) connections over the unspecified bit rate (UBR) virtual channels (VCs);
  - a control node associated with the ATM switch, the control node being arranged to process AAL2 signaling messages which concern the AAL2 connections included in the VCs for which the ATM switch performs the switching operation,
  - wherein the control node comprises:
    - an AAL2 signaling processor which initiates or receives the AAL2 signaling messages;
    - a VC handler unit which stores configuration information.
    - a connection admission control (CAC) unit which makes decisions regarding allocation of resources in a transport network; and
    - an ATM consistency configuration check unit which ensures that switching occurs between appropriate virtual channels (VCs).

23. A method of operating a radio access network which has plural ATM Adaptation Layer 2 (AAL2) source nodes and an AAL2 endpoint node, the method comprising:

associating an Asynchronous Transfer Mode (ATM) switch and a control node to form a traffic concentrator to aggregate user traffic transmitted from the plural AAL2 source nodes to the AAL2 endpoint node;

using the Asynchronous Transfer Mode (ATM) switch to perform a switching operation for switching unspecified bit rate (UBR) virtual channels (VCs) carrying the user traffic between plural virtual paths (VPs), the user traffic being transported as ATM Adaptation Layer 2 (AAL2) connections over the unspecified bit rate (UBR) virtual channels (VCs);

using the control node associated with the ATM switch to process AAL2 signaling messages which concern the AAL2 connections included in the VCs for which the ATM switch performs the switching operation;

providing a connection admission control (CAC) unit at the control node for each of the plural virtual paths involved in the switching operation, and using the connection admission control (CAC) unit to make decisions regarding allocation of resources in a transport network.

24. The method of claim 23, comprising initiating and receiving the AAL2 signaling messages at an AAL2 signaling processor which comprises the control node.

25. The method of claim 23, further comprising providing a VC handler unit at the control node for each of the plural virtual channels involved in the switching operation, and wherein the VC handler stores configuration information.

26. The method of claim 23, further comprising using the connection admission control (CAC) unit to make decisions regarding allocation of resources for a virtual path which originates from the ATM switch with which the control node is associated to form the concentrator.

27. The method of claim 23, further comprising using the connection admission control (CAC) unit to make decisions regarding allocation of resources for a virtual path which originates from an ATM switch other than the ATM switch with which the control node is paired to form the concentrator.

28. The method of claim 23, further comprising using the traffic concentrator to aggregate traffic of plural base stations of the radio access network.

29. The method of claim 23, further comprising carrying the AAL2 signaling messages in virtual channels which do not carry the user traffic and which are either originated or terminated at the control node.

30. The method of claim 23, further comprising carrying the AAL2 signaling messages in at least one constant bit rate (CBR) virtual channel.

31. The method of claim 23, further comprising situating the control node comprises on a board connected to a port of the ATM switch.

32. A method of operating a radio access network which has plural ATM Adaptation Layer 2 (AAL2) source nodes and an AAL2 endpoint node, the method comprising:

associating an Asynchronous Transfer Mode (ATM) switch and a control node to form a traffic concentrator to aggregate user traffic transmitted from the plural AAL2 source nodes to the AAL2 endpoint node;

using the Asynchronous Transfer Mode (ATM) switch to perform a switching operation for switching unspecified bit rate (UBR) virtual channels (VCs) carrying the user traffic between plural virtual paths (VPs), the user traffic being transported as ATM Adaptation Layer 2 (AAL2) connections over the unspecified bit rate (UBR) virtual channels (VCs);

using the control node associated with the ATM switch to process AAL2 signaling messages which concern the AAL2 connections included in the VCs for which the ATM switch performs the switching operation;

providing an ATM consistency configuration check unit at the control node for each of the plural virtual paths involved in the switching operation, and using the ATM consistency configuration check unit to ensure that switching occurs between appropriate virtual channels (VCs).

* * * * *